(12) United States Patent
Orr et al.

(10) Patent No.: US 11,805,088 B2
(45) Date of Patent: *Oct. 31, 2023

(54) CROSS-CHANNEL ORCHESTRATION OF MESSAGES

(71) Applicant: Airship Group, Inc., Portland, OR (US)

(72) Inventors: Elizabeth Marjory Orr, Portland, OR (US); Adam David Coddington, Portland, OR (US); Brett Jon Heckman, Portland, OR (US); Russell Alex Mayhew, Portland, OR (US)

(73) Assignee: Airship Group, Inc., Portland, OR (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/331,322

(22) Filed: May 26, 2021

(65) Prior Publication Data

US 2021/0281528 A1 Sep. 9, 2021

Related U.S. Application Data

(63) Continuation of application No. 16/985,066, filed on Aug. 4, 2020, now Pat. No. 11,050,699.

(Continued)

(51) Int. Cl.
*H04L 51/214* (2022.01)
*H04L 65/1089* (2022.01)
(Continued)

(52) U.S. Cl.
CPC ........ *H04L 51/214* (2022.05); *H04L 65/1089* (2013.01); *H04L 65/4015* (2013.01); *H04W 4/16* (2013.01); *G06F 3/04842* (2013.01)

(58) Field of Classification Search
CPC ............... H04L 51/214; H04L 65/1089; H04L 65/4015; H04W 4/16; G06F 3/04842
See application file for complete search history.

(56) References Cited

U.S. PATENT DOCUMENTS 7,669,177 B2 2/2010 Gerber et al.
7,881,439 B1 * 2/2011 Cohn .................. H04M 3/4938
379/9.03

(Continued)

FOREIGN PATENT DOCUMENTS

KR 10-1545285 B1 8/2015

OTHER PUBLICATIONS

PCT International Search Report and Written Opinion, PCT Application No. PCT/US2020/044901, dated Nov. 6, 2020, ten pages.

(Continued)

*Primary Examiner* — Ninos Donabed
(74) *Attorney, Agent, or Firm* — Fenwick & West LLP

(57) ABSTRACT

Disclosed embodiments herein related to a message management server that provides a platform for message publishers to build message series with different messages that are transmitted to message recipients via different channels. A message publisher may specify triggering conditions for a message series. The message management server may automatically identify message recipients to receive an initial message. The message management server may continue to monitor event notifications related to the message recipients and send subsequent messages in the series to the message recipients when conditions are met. Each message may be sent via a different channel as specified by the message recipients. The platform may include a graphical user interface to provide previews of the messages as rendered in various end user device models when the messages are delivered via the specified channels.

19 Claims, 14 Drawing Sheets

Related U.S. Application Data

(60) Provisional application No. 63/003,047, filed on Mar. 31, 2020, provisional application No. 62/883,520, filed on Aug. 6, 2019.

(51) Int. Cl.
*H04W 4/16* (2009.01)
*H04L 65/401* (2022.01)
*G06F 3/04842* (2022.01)

(56) References Cited

U.S. PATENT DOCUMENTS

| | | | |
|---|---|---|---|
| 8,494,077 B2* | 7/2013 | Haustein | H04L 25/03343 |
| | | | 375/267 |
| 8,543,577 B1* | 9/2013 | Ben-Artzi | G06F 16/355 |
| | | | 707/738 |
| 9,351,193 B2 | 5/2016 | Raleigh et al. | |
| 9,485,177 B2 | 11/2016 | Tung et al. | |
| 9,553,838 B1 | 1/2017 | Panchenko et al. | |
| 9,602,661 B2 | 3/2017 | Rauenbuehler et al. | |
| 9,621,735 B2 | 4/2017 | Ting et al. | |
| 9,635,057 B2 | 4/2017 | Bone et al. | |
| 9,654,581 B2 | 5/2017 | Pollack et al. | |
| 9,911,290 B1 | 3/2018 | Zalewski et al. | |
| 9,959,551 B1* | 5/2018 | Schermerhorn | H04L 67/63 |
| 10,200,486 B2 | 2/2019 | Herrick et al. | |
| 2007/0005717 A1 | 1/2007 | LeVasseur et al. | |
| 2009/0167553 A1 | 7/2009 | Hong et al. | |
| 2013/0054306 A1* | 2/2013 | Bhalla | G06Q 30/0201 |
| | | | 705/7.31 |
| 2014/0006129 A1* | 1/2014 | Heath | G06Q 30/02 |
| | | | 705/14.23 |
| 2014/0089822 A1* | 3/2014 | Wu | G06F 3/04817 |
| | | | 715/761 |
| 2014/0164530 A1* | 6/2014 | Stoertenbecker | H04L 51/52 |
| | | | 709/206 |
| 2014/0258055 A1 | 9/2014 | Wolfe et al. | |
| 2015/0049157 A1* | 2/2015 | Krishnamoorthy | H04L 65/1089 |
| | | | 348/14.1 |
| 2015/0049160 A1* | 2/2015 | Krishnamoorthy | H04L 65/1069 |
| | | | 348/14.03 |
| 2015/0049164 A1* | 2/2015 | Krishnamoorthy | H04N 7/147 |
| | | | 348/14.11 |
| 2015/0112990 A1* | 4/2015 | van Os | G06F 16/435 |
| | | | 707/737 |
| 2015/0193537 A1* | 7/2015 | Cierniak | G06F 16/9535 |
| | | | 707/706 |
| 2015/0212984 A1* | 7/2015 | Bowden | G06Q 50/01 |
| | | | 715/234 |
| 2015/0229592 A1 | 8/2015 | Rathod | |
| 2015/0350068 A1 | 12/2015 | Tung et al. | |
| 2016/0007198 A1 | 1/2016 | Lacey et al. | |
| 2016/0012465 A1* | 1/2016 | Sharp | G06Q 20/321 |
| | | | 705/14.17 |
| 2016/0066273 A1 | 3/2016 | Prats | |
| 2016/0150021 A1 | 5/2016 | Britt et al. | |
| 2016/0182415 A1 | 6/2016 | Ames et al. | |
| 2017/0041742 A1 | 2/2017 | Toksvig et al. | |
| 2017/0142191 A1* | 5/2017 | Caldwell | H04L 67/53 |
| 2017/0193851 A1 | 7/2017 | McNichol et al. | |
| 2017/0279759 A1* | 9/2017 | Liden | H04L 65/1069 |
| 2017/0282736 A1 | 10/2017 | Goei | |
| 2018/0084111 A1 | 3/2018 | Pirat et al. | |
| 2020/0404390 A1* | 12/2020 | Lieberman | H04N 21/436 |

OTHER PUBLICATIONS

European Patent Office, Extended European Search Report and Opinion, European Patent Application No. 20850760.8, dated Jun. 30, 2023, 7 pages.

\* cited by examiner

Message Name

| Message 2: Upgrade |

Orchestration Strategy

| | Channel Priority<br>Organize the channels for this message in order of priority. | ⟩ |
| --- | --- | --- |
| | Fan Out<br>Target a user on all known channels at the same time. | |
| | Channel Priority<br>Organize the channels for this message in order of priority. | |
| | Originating Channel<br>Target channel specified by a trigger event. | |
| | Last Active<br>Target the channel on which the user was last active. | |

⋮⋮⋮  ✉ Email

FIG. 5C

CROSS-CHANNEL ORCHESTRATION OF MESSAGES

CROSS-REFERENCE TO RELATED APPLICATIONS

The present application is a continuation of U.S. application Ser. No. 16/985,066, filed Aug. 4, 2020, which claims the benefit of U.S. Provisional Patent Application 62/883,520, filed on Aug. 6, 2019, and U.S. Provisional Patent Application 63/003,047, filed on Mar. 31, 2020, which are hereby incorporated by reference in their entirety.

TECHNICAL FIELD

The present disclosure generally relates to a server that distributes messages to recipients on behalf of message publishers and, more specifically, to distribution of messages via different channels.

BACKGROUND

Communication channels are often associated with their own requirements, protocols and limitations. An organization may encounter technical difficulties in trying to transmit a message designed for one channel via another channel. The appearance, contents, and overall feeling of the message may be changed significantly when a different channel is used to deliver the message. In some cases, the change in channels may render the message completely undeliverable. On one hand, an organization may not be equipped with the technical specialty to freely switch messages between channels. On the other hand, sending messages through a single channel or a limited set of channels may not be an effective communication strategy.

BRIEF DESCRIPTION OF THE DRAWINGS

FIG. 5A through FIG. 5E are example illustrations of graphical user interfaces provided by a message management server for a message publisher to compose a message series, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein are related to a message management server that provides a platform for message publishers to build message series with different messages. The messages are transmitted to message recipients via different channels. A message publisher may specify triggering conditions for a message series. The message management server may automatically identify message recipients for the initial message in the series based on the triggering conditions. The message management server may continue to monitor event notifications related to the message recipients and send subsequent messages in the series to the message recipients when conditions are met. Each message may be sent via a different channel as specified by the message recipients. The platform may include a graphical user interface to provide previews of the messages as rendered in various end user device models when the messages are delivered via the specified channels.

Example System Environment

Figure 1:
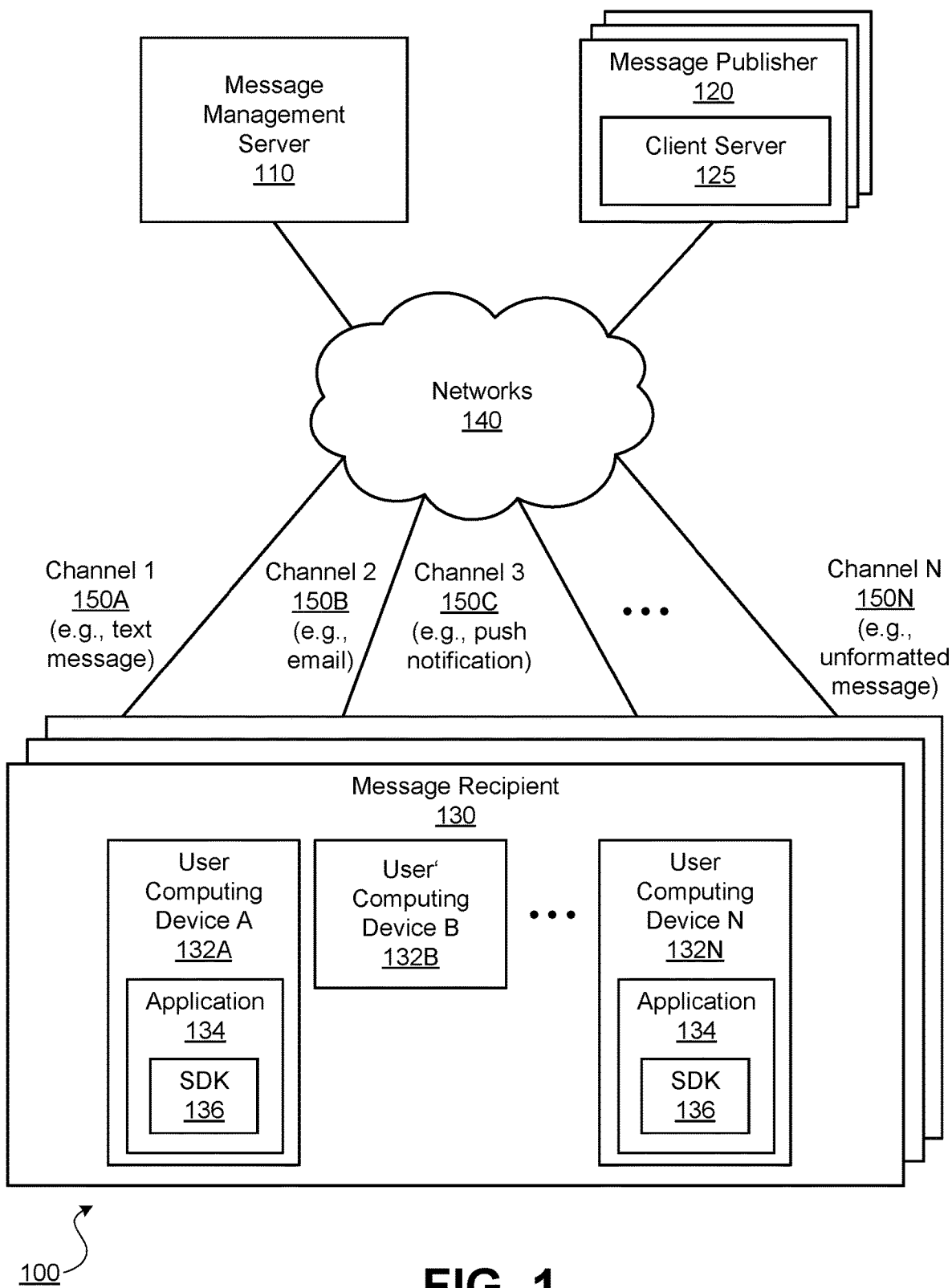
FIG. 1 is a block diagram illustrating an example system environment, in accordance with an embodiment.

Referring now to FIG. 1, shown is a block diagram illustrating an embodiment of an example system environment 100 for performing a cross-channel orchestration process, in accordance with an embodiment. By way of example, the system environment 100 includes a message management server 110, one or more computing devices associated with one or more message publishers 120, and one or more message recipients 130. Each message recipient 130 may be associated with one or more user computing devices 132 (e.g., 132A, 132B, . . . , 132N (N being an nth device, n being some number; generally computing devices 132). The entities and components in the system environment 100 may communicate with each other through networks 140. The message management server 110 may communicate with various user computing devices 132 through different channels 150 (e.g., 150A, 150B, 150C, . . . , 150N (N being an nth device, n being some number); generally channels 150). In various embodiments, the system environment 100 may include fewer or additional components. The system environment 100 also may include different components. Also, while some of the components in the system environment 100 may sometimes be described in a singular form, the system environment 100 may include one or more of each of the components. For example, as noted there may be multiple message publishers 120 and multiple message recipients 130.

The message management server 110 may include one or more computers that perform various tasks related to transmitting messages to various message recipients 130 on behalf of different message publishers 120, determining conditions and channels to transmit various messages, and transmitting a series of messages using different channels 150. Implementation of transmission of messages through different channels may be referred to as a message orchestration.

The message management server 110 may take the form of a combination of hardware and software. The message management server 110 may include some or all example components of a computing machine described with FIG. 10. The message management server 110 may also be referred to as a message managing platform or simply a computing server. The management server 110 may take different forms. In one embodiment, the message management server 110 may be a server computer that executes code instructions to perform various processes described herein. In another case, the message management server 110 may be a pool of computing devices that may be located at the same geographical location (e.g., a server room) or be distributed geographically (e.g., clouding computing, distributed computing, or in a virtual server network). The message management server 110 may also include one or more virtualization instances such as a container, a virtual machine, a virtual private server, a virtual kernel, or another suitable virtualization instance. The message management server 110 may provide message publishers 120 with various message management services as a form of cloud-based software, such as software as a service (SaaS), through the networks 140. Examples of components and functionalities of the message management server 110 are discussed in further detail below with reference to FIG. 2.

Message publishers 120 are various organizations and individuals that interact with the message management server 110. The message publishers 120 may be the customers of the message management server 110. The message publishers 120 can be of different natures and can be any suitable types of organizations, natural persons, or robotic devices. For example, a message publisher 120 can be a government entity that provides important or emergency messages to citizens. In another example, a message publisher 120 can be an educational institute that sends announcements to its students through different channels 150. Some message publishers 120 may also be private businesses or individuals. In one case, a retail business may be a message publisher 120 that uses the service of the message management server 110 to distribute marketing announcements and advertisements to various message recipients 130. In another case, another retail business may use the message management server 110 to transmit gift cards, coupons, store credits, and receipts as various forms of messages to message recipients 130. In yet another case, a message publisher 120 may be an airline that sends passes (e.g., boarding passes) and flight status updates to message recipients 130. In yet another case, a message publisher 120 may be a bank that sends statements and payment reminders to message recipients 130. In yet another case, a message publisher 120 may be a news organization that sends news and articles to its subscribers. In yet another case, a message publisher 120 may be a social networking system that sends feeds and contents to message recipients 130. In yet another case, a message publisher 120 may be an individual who sends messages to his families, friends, and other connected individuals. These are non-exhaustive examples of message publishers 120. A message publisher 120 may be an independent entity of the message management server 110 or may control the message management server 110, depending on embodiments.

Each message publisher 120 may be associated with one or more client servers 125 that are used to communicate with the message management server 110 and message recipients 130. The client servers 125 may also be referred to as message publisher servers 125, message publisher devices 125 or client devices 125. Each client server 125 may be a computing device that can transmit and receive data via the networks 140. The client server 125 may include some or all of the example components described with FIG. 10. A client server 125 performs operations of various day-to-day tasks of the corresponding message publisher 120. For example, a bank (an example message publisher 120) may include a server 125 that manages the balances of accounts of its customers, processes payments and deposits, and performs other banking tasks. In another example, an airline (another example message publisher 120) may include a server 125 that manages the flight statuses, generate boarding passes, and manages bookings of the customers. The precise operations of a client server 125 may depend on the nature of the corresponding message publisher 120.

A message publisher 120 may interact directly with its customers or end users, who are examples of message recipients 130, and may delegate certain operations, such as sending certain types of messages, to the message management server 110. A message publisher 120 may maintain accounts of its users and manage day-to-day interactions with the users while directing the message management server 110 to distributes messages to the users on behalf of the message publisher 120. For example, the message publisher 120 may use a message management system provided by the message management server 110 to design messages and set conditions, channels, and intended recipients of the messages. The message publisher 120, through the message management server 110, may launch a message campaign that includes a series of messages to be automatically delivered to various message recipients 130. The message campaign may involve delivering various messages through different channels 150. In some embodiments, a message may be considered to be transmitted from the message publisher 120 regardless of whether the message publisher's server directly sends the message or the message management server 110 sends the message.

To design a message campaign or to perform some other operations, a message publisher 120 may communicate with the message management server 110 through the client server 125 or a computing device associated with the message publisher 120. The methods of communication may vary depending on embodiments and circumstances. For example, an individual associated with a message publisher 120 (e.g., an employee) may communicate to the message management server 110 through a web application that is run by a web browser such as CHROME, FIREFOX, SAFARI, INTERNET EXPLORER, EDGE, etc. In another case, the message management server 110 may publish a mobile application or a desktop application that includes a graphical user interface (GUI). An individual associated with a message publisher 120 may use the mobile or desktop application to communicate with the message management server 110. In yet another case, a client server 125 may communicate directly with the message management server 110 via other suitable ways such as application program interfaces (APIs).

A message recipient 130 is an intended recipient of messages that may be designed by a message publisher 120 and sent from the message management server 110. Message recipients 130 may be users, customers, subscribers, viewers, or any suitable message recipients of the message publisher 120. Message recipients 130 may also be referred to as end users, or simply users. Message recipients 130 can be individuals, organizations, or even robotic agents. Each message recipient 130 may be associated with one or more user computing devices 132. For example, a user may have a smart phone, a laptop computer, and a tablet. The user computing devices 132A, 132B, . . . 132N may be of different kinds. One or more user computing devices 132 may have the components of a computing machine illustrated in FIG. 10. Examples of user computing devices 132 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices.

User computing devices 132 may also include one or more Internet-of-Things (IoT) devices. An IoT device may be a network-connected device embedded in a physical environment (e.g., building, vehicles, appliances (home or office), etc.). In some cases, an IoT device has general processing power that is comparable to a computer. In other cases, an IoT device may have limited processing resources, low power, and limited bandwidth for communications. For example, an IoT device may be a sensor. An IoT device may be configured to gather and provide information about its physical environment. In various embodiments, an IoT device connects to the network 140 to provide information gathered from and/or associated with the environment that the device is within. Data may be gathered through one or more sensors associated with the device and/or through inputs received through (or via) the device.

Some of the user computing devices 132 may be installed with an application 134 that is developed and operated by the message publisher 120. The application 134 or a portion of it may be developed using a software development kit (SDK) 136 provided by the message management server 110. While the message publisher 120 primarily operates the application 134, the SDK 136 allows the user computing device 132 to communicate with the message management server 110. For example, an example message publisher 120 may be a retail business that develops an application 134 for its customers to purchase items through the application 134. A customer may opt-in to allow the application 134 to track certain analytics. The analytics may be forwarded to the message management server 110 through the SDK 136. The application 134 may run on Swift for iOS and other APPLE operating systems or on Java or another suitable language for ANDROID systems. In another case, an application 134 may be a software program that operates on a desktop computer that runs on an operating system such as LINUX, MICROSOFT WINDOWS, MAC OS, or CHROME OS.

The networks 140 provide connections to the components of the system environment 100 through one or more sub-networks, which may include any combination of the local area and/or wide area networks, using both wired and/or wireless communication systems. In one embodiment, the networks 140 use standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), JavaScript object notation (JSON), structured query language (SQL). In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The networks 140 also include links and packet switching networks such as the Internet.

The message management server 110 may transmit messages to message recipients 130 via different channels 150. A channel 150 may be associated with a communication protocol or another non-standard method. A channel 150 may also be referred to as a communication channel Examples of channels 150 include text messaging services (e.g., SMS, MMS), emails (e.g., mobile emails, plain text emails, browser emails), push notification protocols (e.g., APPLE push notification, ANDROID push notification), instant messaging applications (WHATSAPP, WECHAT, TELEGRAM), in-application messages (e.g., messages sent within application 134), social networking systems (e.g., FACEBOOK, TWITTER), RSS feeds, web browser notifications, other suitable protocols such as simply message payloads sent as an Internet packet or a series of packets. The message management server 110 may decide that a message is to be transmitted through one or more channels based on the setting provided by the message publisher 120. The details of the selection of channels will be discussed in further detail below with reference to FIGS. 2 and 3.

A channel 150 may or may not correspond to a user computing device 132. For certain types of channels 150, the user computing device 132 that will receive the message is fixed. For example, for an SMS message, the user computing device 132 that is associated with the phone number will receive the message. An in-application message may also be sent to the user computing device 132 with which the application 134 is installed. A message intended for an IoT device may also be sent using a channel 150 that is associated with the IoT device. Yet, in other cases, the user computing device 132 that is going to receive the message is not fixed. For example, a message recipient 130 may read an email message from more than one user computing device 132.

Example Message Management Server Components

Figure 2:
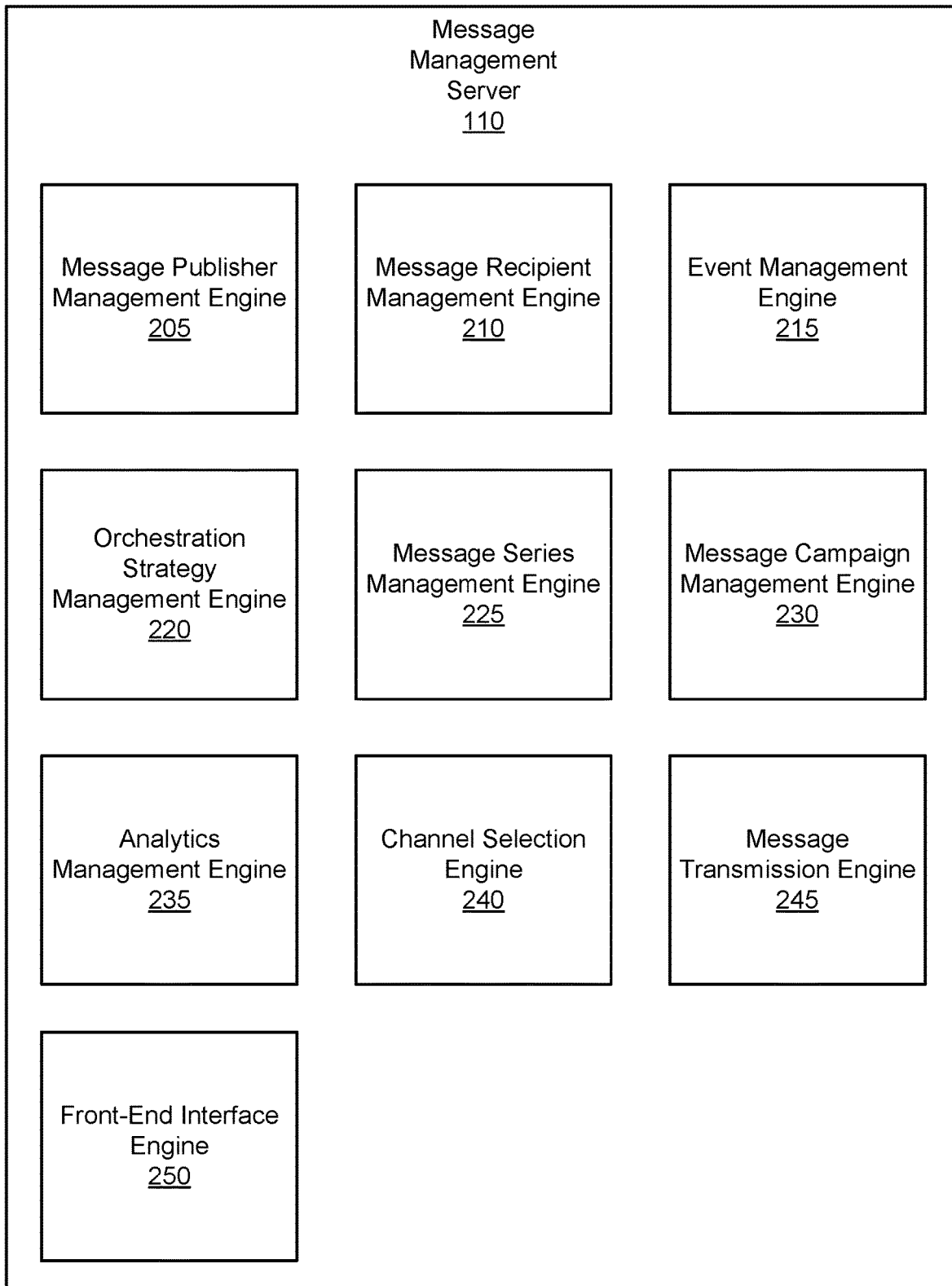
FIG. 2 is a block diagram illustrating various components of an example message management server, in accordance with some embodiments.

FIG. 2 is a block diagram illustrating various components of an example message management server 110, in accordance with some embodiments. A message management server 110 may include a message publisher management engine 205, a message recipient management engine 210, an event management engine 215, an orchestration strategy management engine 220, a message series management engine 225, a message campaign management engine 230, an analytics management engine 235, a channel selection engine 240, a message transmission engine 245, and a front-end interface engine 250. In various embodiments, the message management server 110 may include fewer or additional components. The message management server 110 also may include different components. The functions of various components in message management server 110 may be distributed in a different manner than described below. Moreover, while each of the components in FIG. 2 may be described in a singular form, the components may be present in plurality.

The components of the message management server 110 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 10.

The message publisher management engine 205 manages the profiles and credentials of message publishers 120 and stores saved templates and saved messages for the retrieval of the message publishers 120. For example, a customer that intends to use the message publisher management engine 205 to launch a message campaign to distribute messages to various end users may create an account with the message management server 110. The message management server 110 stores the customer's profile, metadata, credential and associate the information with a unique customer identifier, such as publisherID. The customer (an example of a message publisher 120) may create message templates, message series templates, digital pass templates (e.g., digital boarding passes and digital coupons), specify criteria of message distribution and goals of message campaigns, select or specify types of events and analytics to be captured by the message management server 110, and configure other settings with the message management server 110. The templates and settings are associated with the customer identifier and can be retrieved, duplicated, edited, and deleted based on the message publisher's preferences and actions entered through a message management application and/or API provided by the message management server 110. The message management application also may enable (or provide for display) one or more graphical user interfaces (GUIs) for rendering on, for example, a user computing device 132. Examples of GUIs of the message management application will be discussed in further detail with reference to FIG. 5A through FIG. 5E.

By way of example, the message publisher management engine 205 may include a message publisher profile database, which may also store information including filter preferences, event types, message publisher server destination, and predictive and automation settings for registered users. In other embodiments, the message publisher account database may also store additional services that a message publisher 120 would like to interface with, including the number of active streams associated with the message publisher 120. For example, these additional services can be other message publishers and/or strategic partners. Continuing with the example, a message publisher 120 may optionally choose to create three active streams. One stream may be associated with a server configured to receive a stream generated associated with a message publisher 120 at a specific server destination, e.g., www.foo.com, another with a server associated with a social media system, e.g., FACEBOOK, TWITTER, PINTEREST, etc., and the last with a server associated with a message publisher organization. In some example cases, the preferences associated with a message publisher profile may be a username and/or destination address. The message management server 110 may also be configured to accept additional message publisher preferences. This additional message publisher information may capture targeted demographics information, spending habits, travel habits, and other such details.

The message recipient management engine 210 manages the message recipients to whom the messages are sent. Each message publisher 120 may be associated with a set of intended message recipients 130. A message recipient 130 may be associated with a recipient identifier, recipientID. Each computing device 132 associated with the message recipient 130 may be associated with a device identifier, deviceID. For some devices, the message recipient management engine 210 may also store application identifier, applicationID, for identifying actions occurred at or related to an application 134 and track in-application messages sent through the application 134. A set of recipientIDs, deviceIDs, and applicationIDs may be associated with a publisherID. The message recipient management engine 210 may maintain metadata tags for message recipients 130, such as whether a recipient is a natural person or not, preferences of the message recipients 130, opt-in or opt-out options of the message recipients 130 (e.g., a message recipient may opt-out for receiving a message from a particular channel), and other characteristics of the message recipients, including consented information such as gender, age, interested products, interested news, etc. Based on the characteristics of the message recipients 130, the message recipient management engine 210 may categorize the message recipients into one or more groups. The message recipient management engine 210 may also store records of messages sent to each message recipient 130, such as metadata of the messages (e.g., date and time of the messages, the channel identifier, channelID, used to send a particular message), the payloads of the messages, actions taken or related to each sent message, and types of devices and deviceIDs to which the message are sent.

The event management engine 215 manages and stores events associated with message recipients 130 and events associated with user computing devices 132. The events may be transmitted from the message publishers 120, from third parties, or from the user computing devices 132.

For events transmitted from the message publishers 120 or third parties, by way of example, a message publisher 120 may be an airline that transmits an event notification to the message management server 110 that a flight is delayed and identifies the passengers of the flight based on the recipientIDs. Based on the event notification, the message management server 110 may send a message to the passengers. In another example, a message publisher 120 may be a bank that sends an event notification to the message management server 110 that an end user has settled a transaction. Based on the event notification, the message management server 110 sends a confirmation message to the end user. In yet another example, the event may be transmitted from a third party. The message management server 110 may identify message recipients 130 that are potentially affected by the event notified by the third party.

The events may also be sent from various user computing devices 132 associated with message recipients 130. Those event notifications may be referred to as mobile event notifications. Each mobile event notification may be associated with a message recipient 130 and be saved along with an event identifier, eventID, a messageID and a recipientID. Mobile event notifications may be transmitted from mobile event sources. In various embodiments, a mobile event source may be an IoT device or a user computing device 132 running an application 134. The application 134 is configured to generate and transmit a mobile event notification. For example, the SDK 136 may include code instructions to cause a user computing device 132 to transmit a mobile event notification to the message management server 110.

A mobile event notification from a user computing device 132 may include a notification payload and a destination associated with a message publisher 120. In various embodiments, the destination is a network address such as a message publisher computer, a proxy server, or another device configured to receive data streams from message management server 110. For example, the destination may be a specified universal resource locator (URL), e.g., "www.message publisher.com/proxyserver". The notification payload associated with a mobile event notification, received by message management server 110, may include an event descriptor and a notification identifier.

The event descriptor may include at least one of an application lifecycle event, a user engagement event, a user behavior event, a user insight event, a user location event, or any combination thereof. In one example, an event descriptor is an application lifecycle event such as a "first open" of an application 134, an "inactivity" event (e.g., an application 134 has been inactive), an "app open" event, an "app close" event, or an "app uninstall" event; a user engagement event such as a "push", a "push send", a "rich deliver", a "rich read", a "rich delete", an "in application display", a "digital pass object install" or a "digital pass object remove"; a user behavior event such as a "tag update" event, an "app open" event, an "app close" event, or other custom events defined by a message publisher 120. In some embodiments, the event descriptor may also include a user location event such as geolocation, or timestamp data or a user insight event associated with a prediction of a future application lifecycle event, user engagement event, user behavior event, user location event, or any combination thereof. For the ease of reference, all those events, whether they are related to application lifecycle, user engagement, location, or timestamp, may be collectively referred to application lifecycle events.

By way of example of a mobile event notification, a user computing device 132 (e.g., a mobile phone, an IoT device) sends a mobile event notification to message management server 110 if the user computing device 132 is within a threshold distance of a store of a message publisher 120, or if the user opens the application 134 or interacts with an IoT device.

A notification identifier may include an identification of the notification and other identification information. For example, the identification may include a userID, an applicationID, a message publisherID, a deviceID, deviceType, or any combination thereof. For example, a mobile event notification generated by a user computing device 132 associated with a user "Nolan" may include a message that a user associated with userID: "Nolan", a deviceID: "02", an event descriptor: "app uninstall" associated with a message publisherID: LATTE, INC., at Time: 11:00 PM PST near a location of 123 Main Street, Portland, Oreg.

In some embodiments, a mobile event source is an IoT device associated with a message publisher 120. An IoT device may be configured to transmit a mobile event notification to message management server 110. For example, an IoT device may be a temperature sensor that generates a mobile event notification with the current temperature and transmits the generated mobile event notification to the message management server 110 via network 140.

In some embodiments, upon receiving a mobile event notification from a user computing device 132, the event management engine 215 generates a mobile event token. The mobile event token may be derived (e.g., a hash) in some way from the received mobile event notification and/or metadata relating thereto. In some embodiments, a single mobile event token is assigned to a plurality of received mobile event notifications. Additionally, as used herein, the process of generating a mobile event token from a mobile event notification may be referred to as "decorating a received mobile event notification" and can be used to provide context to mobile event notifications received from a user computing device 132.

In some embodiments, the event management engine 215 may generate the mobile event token by communicating with a number of contextual services. The event management engine 215 may include code segments for generating a mobile event token including assigning context obtained from one or more contextual services. Contextual services may further include any number of modules that extract timestamp data, demographic data associated with a user, GPS data, historical data including historical trends, or any combination thereof from a received mobile event notification. For example, upon receiving a mobile event notification associated with an "app open" event from a user computing device 132, the event management engine 215 generates a mobile event token including a timestamp and a GPS location associated with the received event. In other embodiments, the contextual data assigned to a mobile event token associated with a mobile event notification may be associated with a certain user computing device 132 including one or more identifiers. In still other embodiments, the message management server 110 may decorate a mobile event token with a predicted user behavior including a future user engagement event, an application lifecycle event, or any combination thereof.

The orchestration strategy management engine 220 stores strategies and rules provided by message publishers 120 for the transmission of messages to various message recipients 130. In some message campaigns, the same message may be sent to a message recipient 130 through multiple channels 150 or a series of related messages may be sent to the message recipient 130 through different channels 150. The transmission of messages through different channels 150 may be referred to as channel orchestration. For example, a message publisher 120 may set up a message series for a payment reminder. The first reminder message may be sent through a less disruptive channel 150 such as by an email. Subsequent reminder messages may be sent through more disruptive channels 150 such as a publish notification, an in-application notification, and an SMS message.

The orchestration strategy management engine 220 may allow a message publisher 120 to pick different channel selection rules for each message or a series of messages. Example channel selection rules may include channel priority with fall back, last active, originating channel, and fan out option. When the message management server 110 sends a message to a message recipient 130, the message management server 110 selects one or more channels 150 based on the channel selection rules associated with the message.

A channel selection rule for channel priority with fall back allows a message publisher 120 to select the priority of the channels to send a message and select fall back channels if a higher-priority channel(s) is not available. A channel selection rule may be applicable to a large group of message recipients 130. The message recipient management engine 210 may provide a list of available channels 150 (e.g., channels that are opted in, or not opted out) for each intended message recipient 130. Each intended message recipient 130 may be associated with a different list of available channels 150. The message management server 110 attempts to send the message to the highest priority channel first and fallbacks to alternative channels if a message recipient 130 does not opt in for the highest priority channel.

The channel selection rule for the last active channel or the originating channel specifies that the message management server 110 sends a message based on the message recipient's last active channel or the originating channel. The event management engine 215 may provide mobile event notifications that include information on whether a user has taken an action (e.g., opening a message, responding to an email, etc.) with respect to a channel 150. If the user takes an action that triggers the message management server 110 to send another message, the new message may be sent to the same channel. This reaction by the message management server 110 may be selected by the originating channel selection rule. The originating channel selection rule may also specify that the message management server 110 to target a channel 150 associated with a trigger event. For example, the message publisher 120 may direct the message management server 110 to send a message when a trigger event is detected from a channel 150 or associated with an application related to a channel 150. For example, a message publisher 120 may specify that a new message is to be sent when a location event is detected (e.g., a device enter a radius or a territory of a location). The location event may be sent from an application 134. The message management server 110 may send the new message through an in-application message or a push notification associated with the application 134.

The channel selection rule for fan-out specifies that the message management server 110 to send the same message to a message recipient 130 through multiple channels 150 simultaneously or within a reasonable timeframe. A message publisher 120 may select multiple channels 150 for the fan-out option. For a specific message recipient 130, the message management server 110 sends the message through various channels 150 unless one or more channels are opted-out by the message recipient 130.

The message series management engine 225 allows message publishers 120 to design a message series. Each message series may be referred to as a journey. A message series may include a series of related messages that are sent to a message recipient 130 when a certain condition is met. The message series management engine 225 manages the message series that are designed and saved by various message publishers 120. A message series may be associated with a start condition, an end condition, message recipient selection criteria, a message order, message branching, and triggering conditions and channels 150 to be used for each message in the series.

A start condition may include various rules that specify when a message series will be triggered for a particular candidate message recipient 130. A triggering condition may be an event, such as a mobile event when the message management server 110 receives a mobile event notification. For example, a message series may be triggered when a user first opens the application 134. A triggering condition may also be another event whose notification is provided the message publisher 120 or a third party. For example, a message series may begin 24 hours after a user has created an account with the message publisher 120. Other triggering condition may include tag change, inactivity, first seen, location matching, location attributes, and an event occurring. The start condition may also include timing and date for the first message in the message series to be sent after a triggering condition is met. In some cases, the message series starts immediately after a triggering condition is met. In other cases, the message series is scheduled based on the timing and date. The start condition may also include certain limitations. For example, the limitation may prevent the message management server 110 from involving a message recipient 130 in more than a certain number of message journeys within a predetermined period of time. The limitation may also prevent the message management server 110 from involving a message recipient 130 in a repeated message journey. A triggering condition may also be a risk factor such as a churn risk associated with an application 134 or a channel 150.

An end condition may include various rules that specify when a message series is completed. A message publisher 120 may specify that a message series is completed after all messages in the series are sent. Other end condition examples may specify rules for a message series to end prematurely. For example, a message series may end on a conversion event or a cancellation event. A conversion event is associated with a conversion condition. The message management server 110 may exit a message recipient 130 when the conversion event is detected. For example, in a marketing campaign, when a message recipient 130 clicks on an advertisement that is sent as a message, the message publisher 120 may specify that the clicking of the advertisement is a successful conversion. In another example, if the message series is for reminding a user to make a monthly payment, the conversion event may be that the user has made the monthly payment. A cancellation event may be an event that is indicated by the message recipient 130 or the message publisher 120 to stop the message series when the cancellation event is detected. For example, a message recipient 130 may want to opt-out or unsubscribe from the message series.

The message recipient selection criteria allow a message publisher 120 to select what users will be selected for a particular message series. The selection criteria could be event-based, metadata tag-based, device-type-based, channel-based, or any combination thereof.

The message order and message branching allow a message publisher 120 to select how the messages in a series are arranged. A message series can be linear or can be branched. The message publisher 120 may also specify conditions to skip one or more messages.

The triggering conditions and channels 150 to be used for each message in the series are rules that are specified by a message publisher 120 how when a message will be sent after one or conditions are met. The triggering condition for a message may be time-based. For example, a second message may be sent 2 days after the first message is sent. The triggering condition for a message may also be event-based, such as when the message management server 110 receives a mobile event notification that matches the triggering condition. The event-based triggering condition may also include a time element such as a delay after the event condition is met. Other trigger conditions discussed in this disclosure are also possible. For each message, a message publisher 120 may also select a channel selection rule based on the discussion above with reference to the orchestration strategy management engine 220.

The message campaign management engine 230 manages message campaigns designed by various message publishers 120. A message campaign may be a goal-based collection of multiple related message series. For example, a message publisher 120 may design a goal-to-goal branching of multiple message series. Each message series may have a goal that is specified in the end condition of message series. The message series are linked together in any suitable ways, branched or linear, cyclic or acyclic. A message campaign may also be referred to as a primary message plan.

The analytics management engine 235 provides statistics and analytics for messages, message series and message campaigns. After messages are sent to message recipients 130, the message management server 110 may receive responses from the message recipients 130, mobile event notifications, or other notifications related to the messages. For some of the messages, the message management server 110 may also receive no action from the recipients or any notification at all. A message management server 110 may keep track of the number of users in each message series, actions taken by the users (or inactions) after receiving messages, and other metrics such as rates of meeting certain triggering criteria. A message publisher 120 may start a message series or a message campaign in real-time. The message management server 110 may display how many users (message recipients 130) are in each message series and other live analytics in real-time for each message or each message series as a summary of the progress of each message series.

The channel selection engine 240 selects one or more channels 150 for transmitting or distributing a message. The channel section engine 240 may select the channels 150 based on the channel selection rules specified by the message publisher 120 as discussed in the orchestration strategy management engine 220. The channel selection engine 240 may also perform a channel retargeting operation. The message management server 110 may monitor events such as user behaviors in one channel 150 and decide to send follow up messages in a message series to the users on a different channel. For example, the message management server 110 may determine an application churn risk with respect to a user. In response to the churn risk being higher than a threshold, the message management server 110 may decide to change an in-application message to another channel that is less reliant on the application (e.g., an email channel). The message management server 110 may monitor the interaction or lack of action of the users with one or more messages to determine whether the user receives messages on alternative channels. The message management server 110 may switch from a channel 150 that is tied to one or more applications (e.g., push notification, in-application message, web notification, instant messages in a chat application) to another channel 150 that is more independent.

A churn prediction system (CPS), which may be one or more machine learning model operated by the message management server 110, may be used to predict if a user will not stop opening an application or will stop opening an application associated with a customer over a future time period. By way of example, a user that will stop opening the application is classified as having churned and a user that will not stop opening the application is classified as not having churned.

The CPS generates a machine learning model based on historical event data from a plurality of other users of the application associated with the customer wherein inputs to the model comprise feature vector. The type of machine learning algorithms used may be a regression model, a decision tree model, a support vector machine, a neural network, a convolutional neural network, a recurrent neural network, a long short term memory network, etc. In an embodiment, the output of the generated model is a likelihood of churn. The historical event data includes the churn related behavior of each of the other users, such as those transmitted from mobile event notification. Based on the historical data, the churn prediction system extracts a feature vector for each of the plurality of other users. The extracted feature vectors are classified into a positive training set and a negative training set. In one or more embodiments, the CPS trains the machine learning model using the positive and negative training set. In another embodiment, instead of using a binary classification (optimized or not optimized), the set of training samples may include more than two subsets.

The training of a machine learning algorithm may include an iterative approach to gradually improve an objective function associated with the machine learning algorithm using the training set. The machine learning algorithm may include coefficients and/or, in the case of neural network, multiple layers and each layer may have multiple nodes (e.g., neurons in a neural network). The layers and the nodes may be associated with multiple kernels, coefficients, and weights that can be adjusted. Training the machine learning algorithm may include forward propagation and back propagation. In forward propagation, the machine learning algorithm relies on the values of the kernels, coefficients, and weights in the current iteration to make predictions of the training samples' labels. For example, the message management server 110 may input the feature vector to the machine learning algorithm to make a prediction whether the churn will occur or not. The prediction of whether churn will occur or not is then compared to the actual label of the training sample. The objective function may be a loss function that determines how well the machine learning algorithm makes predictions for the overall training set (e.g., how many correct predictions out of a set of training samples) in a given iteration. In back propagation, the message management server 110 uses techniques such as coordinate descent to adjust the values of the kernels, coefficients, and weights in a direction that is projected to improve the value of the object function. In the next iteration, forward propagation is executed again to make a new round of predictions using the newly adjusted values of the kernels, coefficients, and weights. Forward and back propagations are executed in multiple iterations to continue to improve the performance of the machine learning algorithm. Training may be completed when the model converges (e.g., the value of the objective function no longer improves notably) or after a predetermined number of iterations. The kernels learned in the training process often related to various features or summaries that are associated with attributes or things that signify whether a step is optimized or not optimized.

The CPS retrieves historical event data associated with the user and extracts a feature vector from the historical event data. The CPS applies the extracted feature vector to the trained model as an input and determines a likelihood of churn associated with the user. In some embodiments, the CPS additionally determines a risk of churn associated with the user. In still other embodiments, the CPS receives a set of users and the CPS generates a report indicating a percentage of the set of user that have a high, medium, and low risk of churn in a future time period.

The message transmission engine 245 formats messages in appropriate forms, applies certain communication protocols and transmits the messages to message recipients 130. In some embodiments, the message transmission engine 245 may receive text and images of a message payload from a message publisher 120. For example, the message publisher 120 may design a message using an application provided by the message management server 110. Certain message channels and user computing devices 132 may require a message format in order for the message to be transmitted. For example, an SMS message may not contain an image. The format of a push notification may depend on the operating system of the user computing device 132. The appearances of certain messages may also be affected by the display resolution of the user computing devices 132. The message transmission engine 245 may package a message payload based on the selected channel. The message transmission engine 245 may convert the payload to an appropriate format that is compatible with a message channel, such as JSON, XML, key-value pairs, HTML, etc. Certain channels may also be associated with specific communication protocols. For example, emails may use standard mail protocols, such as Simple Mail Transfer Protocol (SMTP). A message may also need certain headers to be transmitted. The message transmission engine 245 may generate the message payload and convert the payload to one or more network packets to be sent to the message recipients 130.

The message transmission engine 245 may also check rules and timing that may restrict the transmission of a message to a specific message recipient 130. For example, a message publisher 120 or a message recipient 130 may restrict the timing for transmitting certain messages (e.g., a do-not-disturb period). There may also be other rules that restrict the transmission of messages to certain recipients 130.

The front-end interface engine 250 may be a software application interface that is provided and operated by the message management server 110. For example, the message management server 110 may provide a software system for message publishers 120 to design and manage various messages, message series, and message campaigns. Examples of the GUI elements of the front-end interface engine 250 are shown in FIG. 5A through FIG. 5E. The application provided by the message management server 110 may be distinguished from the application 134 shown in FIG. 1. The application provided by the message management server 110 may be an application for message publishers 120 to manage their message campaigns. In contrast, the application 134 may be provided by a message publisher 120 for its end users. For example, the application 134 may be a retail business application in which users can purchase items and manage coupons. The application provided by the message management server 110 provides a management platform for the retail business application to manage its message campaigns, such as promotional and marketing messages to be sent to end users.

The front-end interface engine 250 may take different forms. In one embodiment, the front-end interface engine 250 may control or in communication with an application that is installed in a client device 125. For example, the application may be a cloud-based SaaS or a software application that can be downloaded in an application store (e.g., APPLE APP STORE, ANDROID STORE). The front-end interface engine 250 may be a front-end software application that can be installed, run, and/or displayed at a client device 125. The front-end interface engine 250 also may take the form of a webpage interface of the message management server 110 to allow message publishers 120 to access data and results through web browsers. In another embodiment, the front-end interface engine 250 may not include graphical elements but may provide other ways to communicate with message publishers 120, such as through APIs. The API may be in compliance with any common API standards such as Representational State Transfer (REST), query-based API, Webhooks, etc. The data transferred through the API may be in formats such as JSON and XML.

Example Message Object Hierarchy

Figure 3:
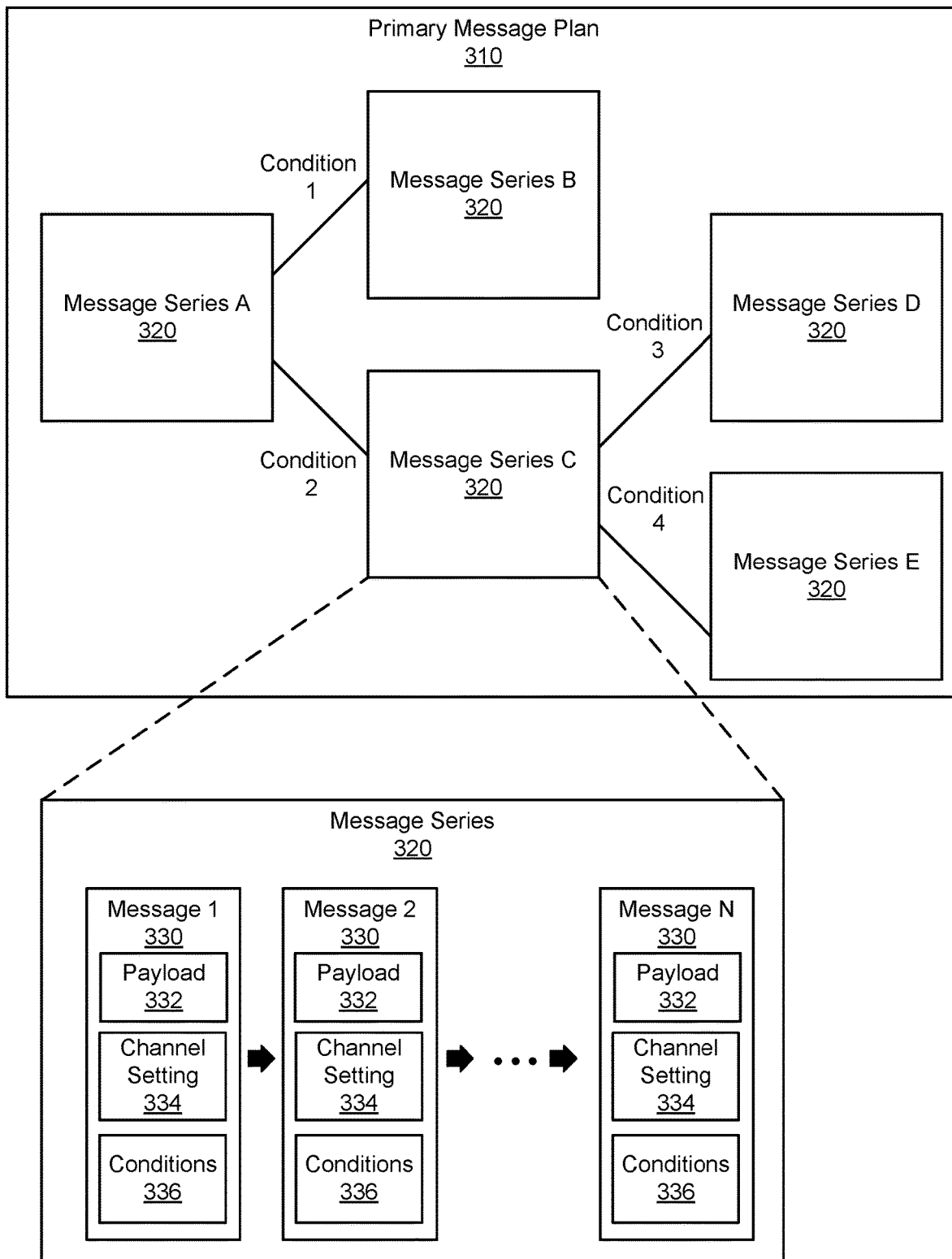
FIG. 3 is a block diagram illustrating an example message object hierarchy that may be used with the message management server, in accordance with some embodiments.

FIG. 3 is a block diagram illustrating an example message object hierarchy that may be used with the message management server 110, in accordance with some embodiments. A primary message plan 310 may include multiple series 320. The primary message plan 310 may also be referred to as a message campaign. Each message series 320 may be referred to as a message journey. Each message series 320 may include one or more messages.

The message series 320 in the primary message plan 310 may be connected in any suitable ways, branched or linear, cyclic or acyclic. The primary message plan 310 may be associated with a set of target recipient criteria that specify which candidate message recipients 130 may enter the message campaign associated with the primary message plan 310. The selection criteria may also be the triggering condition of the first message series A in the primary message plan 310. For example, a candidate message recipient 130 who meets the trigger condition of the first message series A will receive the first message in the message series A and be enrolled in the primary message plan 310. Each message series 320 may be associated with an end condition that is discussed above with reference to the message series management engine 225 in FIG. 2. In some embodiments, a message series 320 may include two or more alternative end conditions, such as the condition 1 and the condition 2 shown in FIG. 3. The message management server 110 may enroll the message recipient 130 to another message series based on the fulfillment of one of the alternative conditions. In some embodiments, except the first message series A, other message series' start condition may be the end condition of the preceding message series based on the branching and connections among the message series 320.

The end condition of a message series 320 may be a goal of the message series 320. For example, the goal of sending a series of messages to a message recipient 130 may be to induce the recipient to perform a certain action. The message management server 110 may receive event notification from a user computing device 132 or from the message publisher 120. The action of the message recipient 130 meeting the end condition of a message series 320 may be a goal of the message series 320. The inaction of the message recipient 130 may be end condition of the same message series 320. Based on the end condition, the message recipient 130 is routed to another succeeding message series 320. Based on the end conditions of various message series 320, the primary message plan 310 provides a goal-to-goal branching of message series 320.

Each message series 320 may include one or more messages 330 that may be connected in any suitable ways, branched or linear, cyclic or acyclic. A message publisher 120 may arrange the order and branching of the messages 330 and compose each message 330. The message publisher 120 may design the payload 332, the channel setting 334, and the conditions 336 triggering a specific message. The message payload 332 may include text, image contents, and multimedia contents such as voice, videos, and music. The channel setting 334 may be based on the channel selection rules as discussed above with reference to the orchestration strategy management engine 220. The message publisher 120 may also specify criteria related to channel retargeting or allow the message management server 110 to automatically perform the channel retargeting. The message publishers 120 may also specify the conditions 336 for triggering a message 330 to be sent. The conditions 336 may specify that a succeeding message is sent automatically or after a time delay. The conditions 336 may also specify a mobile event notification for the triggering of a special message. A message 330 may be skipped if the conditions 336 are not met. Other possible conditions are discussed above with reference to the message series management engine 225.

Example Message Series Composition Process and GUI

Figure 4:
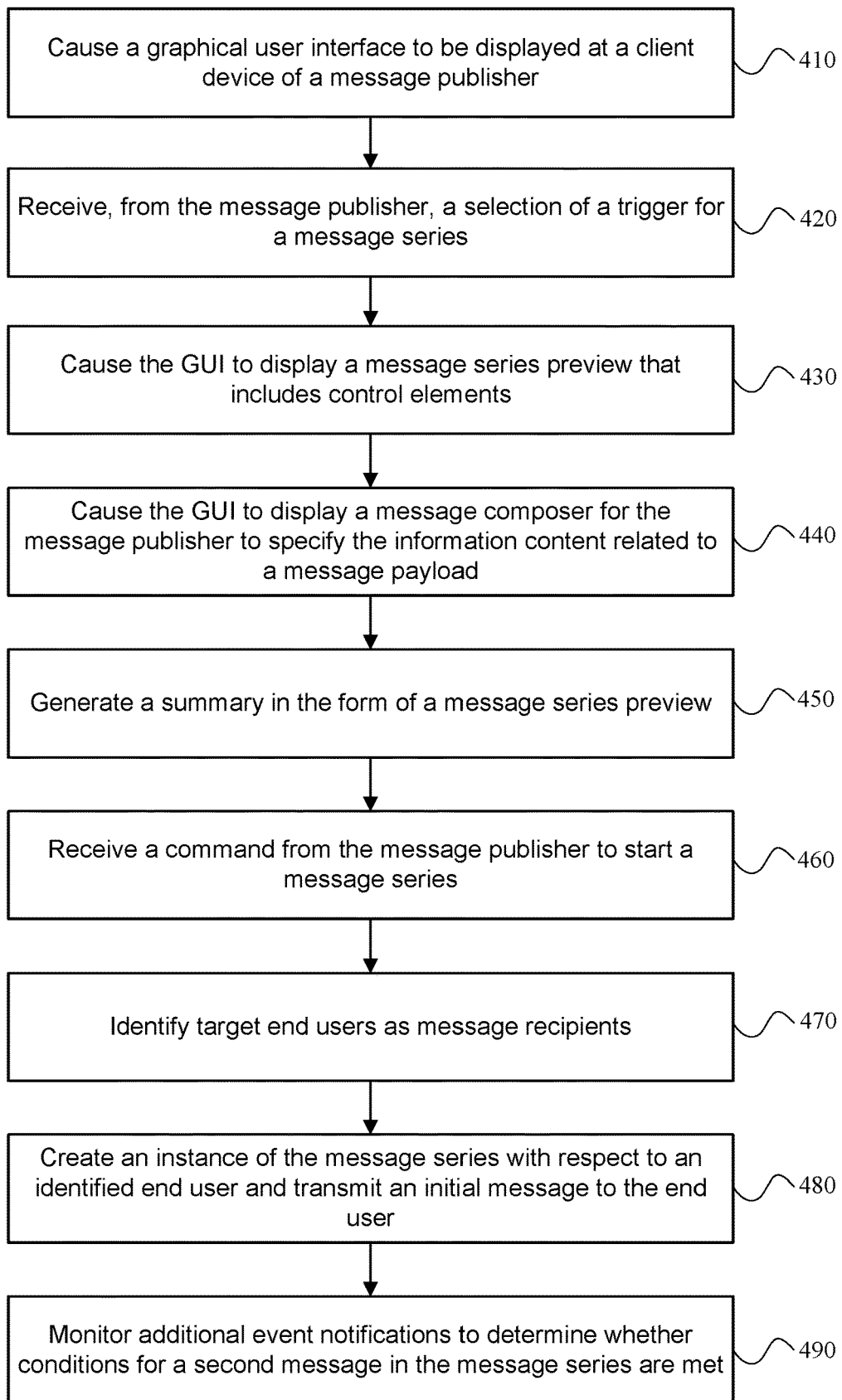
FIG. 4 is a flowchart depicting an example process for a message management server to provide an interface for a message publisher to compose and launch a message series, in accordance with some embodiments.

FIG. 4 is a flowchart depicting an example process 400 for the message management server 110 to provide an interface for a message publisher 120 to compose and launch a message series 320, in accordance with some embodiments. FIG. 5A through FIG. 5E are example illustrations of graphical user interfaces provided by the message management server 110 for a message publisher 120 to compose a message series 320, in accordance with some embodiments. FIG. 4 is discussed in conjunction with FIG. 5A through FIG. 5E.

The message management server 110 may cause 410 a GUI to be displayed at a client device 125 of a message publisher 120. The GUI may include a plurality of control elements for the message publisher 120 to build a plan for a message series 320. For example, the GUI may include control elements, which may be arranged in a sequence such as a wizard, to allow the message publisher 120 to build a message series 320. The message series 320 may be defined by a series of rules and logic for the message management server 110 to automatically transmit one or more messages to a plurality of target end users (target message recipients) on behalf of the message publisher 120 when certain conditions are met. In one embodiment, the GUI may take a form of a web browser application. In another embodiment, the GUI may take the form of a software application (e.g., a mobile application) published by the message management server 110 and installed on a client device 125 of the message publisher 120.

A message publisher 120 may build a message series 320 that specifies the conditions, target end users (examples of message recipients 130), and channels 150 for a series of messages to be automatically transmitted the message management server 110 in a period of time in response to one or more conditions being met. In one embodiment, the message series 320 may be associated with an initial trigger that marks the initiation of an instance of the message series 320 being implemented for an end user. The message management server 110 may monitor events associated with end users and determine if an event that meets the conditions of the initial trigger occurs at one or more end users who fit the criteria as specified by the message publisher 120. In response to the initial trigger, the message management server 110 may implement the message series at the target end user by sending an initial message to the target end user via a first channel 150. The message management server 110 may continue to monitor the events and activities of the target end user to determine if additional conditions specified in the message series 320 are met. Additional messages are automatically transmitted by the message management server 110 in response to that events and activities that meet the additional conditions are detected. The events and activities of the end users may be monitored by the event management engine 215 as discussed above.

The message management server 110 may operate or be in communication with a GUI for the message publisher 120 to build a plan for the message series 320. The GUI may include a landing page, which allows the message publisher to select to build a new message series 320. The message publisher 120 may select to create a new message series 320. In response, the GUI may display a plurality of control elements that may be arranged in a sequence to allow the message publisher 120 to build the message series 320 step by step.

Figure 5A:
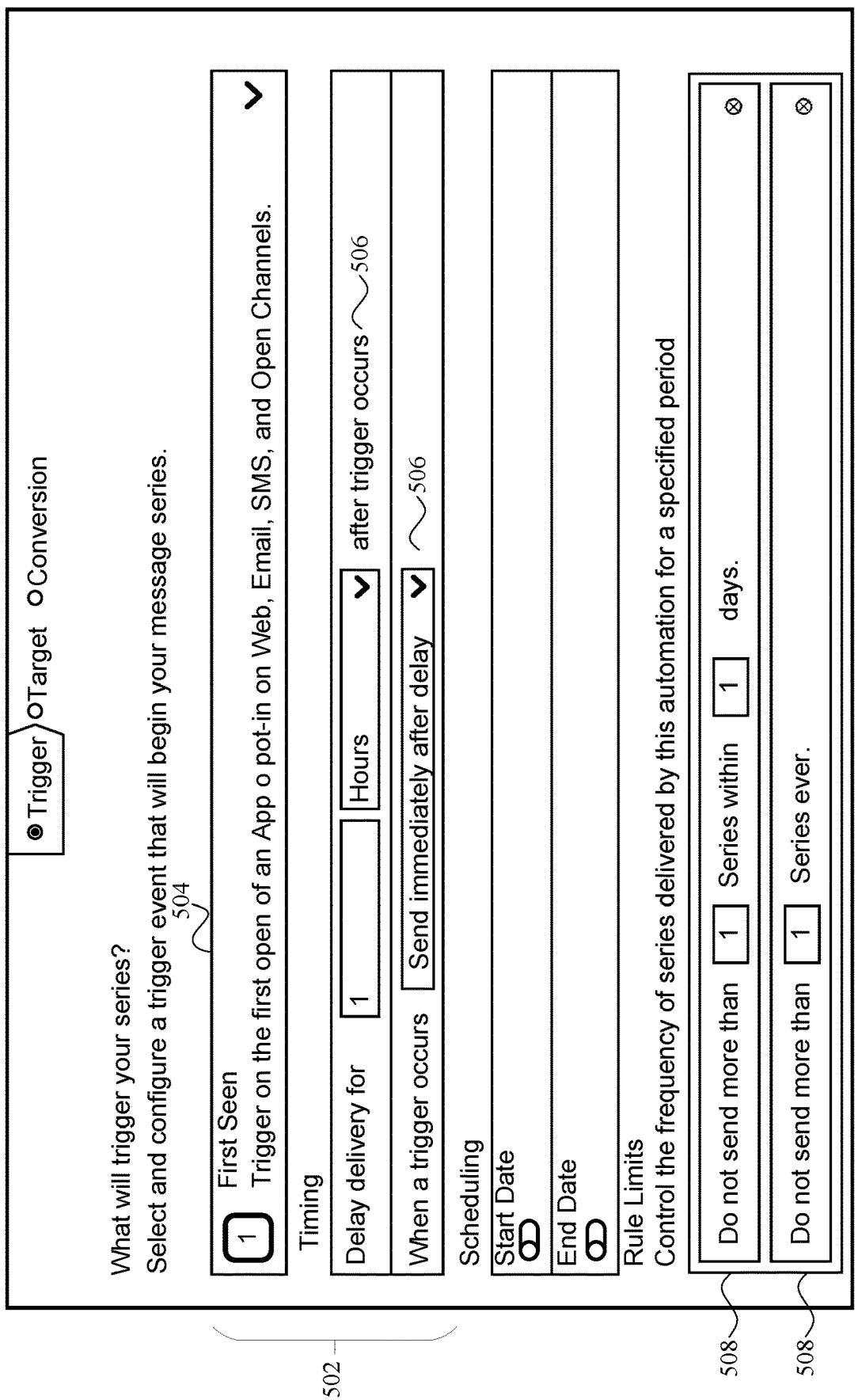

Referring to FIG. 5A, the GUI may display a first subset of control elements 502 that correspond to a plurality of candidate triggers 504. A candidate trigger may specify one or more rules that define conditions in which the message series 320 will be started to be implemented at a target end user who will receive an initial message in the message series and potentially additional messages if more conditions are met. The message management server 110 may receive 420, from a message publisher 120, a selection of a trigger for the message series 320.

There may be one or more types of candidate triggers. A GUI may include one or more of the following candidate triggers. For example, a candidate trigger may be a risk category trigger. The message management server 110 may define a plurality of risk levels based on events of end users. The message management server 110 may define one or more metrics that quantify the events associated with a particular end user and classifies the end user to one of the risk levels. As various events occurred at the end user, the risk level may change. The risk category trigger may be triggered in response to the end user entering a target risk level.

Another candidate trigger may be a tag change trigger. The message management server 110 may identify an end user by a unique identifier and may associate the end user with a plurality of metadata tags. The tag change trigger may be triggered in response to a tag is added or removed. Another candidate trigger may be an inactivity trigger. The message management server 110 may monitor activities of a mobile application 134 or an end user's webpage visit. An inactivity trigger may be triggered in response to the application 134 has been inactive for a duration or an end user has not visited a webpage for a duration.

Another candidate trigger may also be a first-seen trigger that may be triggered in response to an end user first opens a mobile application or first opts in on a website, email, SMS, or an open channel. Another candidate trigger may be a location trigger that may be triggered in response to an end user device entering or exiting a location. Another candidate trigger may be a location attribute trigger that may be triggered in response to an end user device entering or exiting a location with predefined attributes. Another candidate trigger may be an event trigger that may be triggered in response to the detection of an event. An event notification may be provided to the message management server 110 from the message publisher 120, from a third party, or via a mobile event notification.

Continuing to refer to FIG. 5A, the message management server 110 may cause the GUI to display other control elements that allow the message publisher 120 to customize one or more rules 506 specified in the trigger that is selected by the message publisher 120. The rules may specify one or more conditions on how the message series 320 is implemented and how the initial message may be sent. For example, the message publisher 120 may set a delayed delivery for the initial message after a triggering event occurs. The message publisher 120 may also set a time interval for the initial message to be sent. In one embodiment, the message publisher 120 also may specify the date range of the transmission of the initial message.

In some embodiments, the message publisher 120 further may impose one or more rules or limitations 508 on the transmission of the initial message or on the implementation of the same message series 320 on the same end user. For example, the GUI may include a control element that allows the message publisher 120 to select a limit on a number of the message series 320 to be sent to the same end user within a time interval.

In some embodiments, the message management server 110 may cause the GUI to provide options for the message publisher 120 to select one or more criteria of target end users. In one case, the criteria for selecting target end users may be standardized and suggested by the message management server 110. In another case, the criteria may be customized by the message publisher 120. The collection of customized criteria may be saved in one or more customized profiles. In addition, the message publisher 120 may add a rule that specifies one or more metadata tags that are associated with a candidate end user. The metadata tags may be used to include or exclude the candidate end user as the target end user. For example, the message publisher 120 may specify end users with a tag "football" to be the message recipients 130.

Figure 5B:
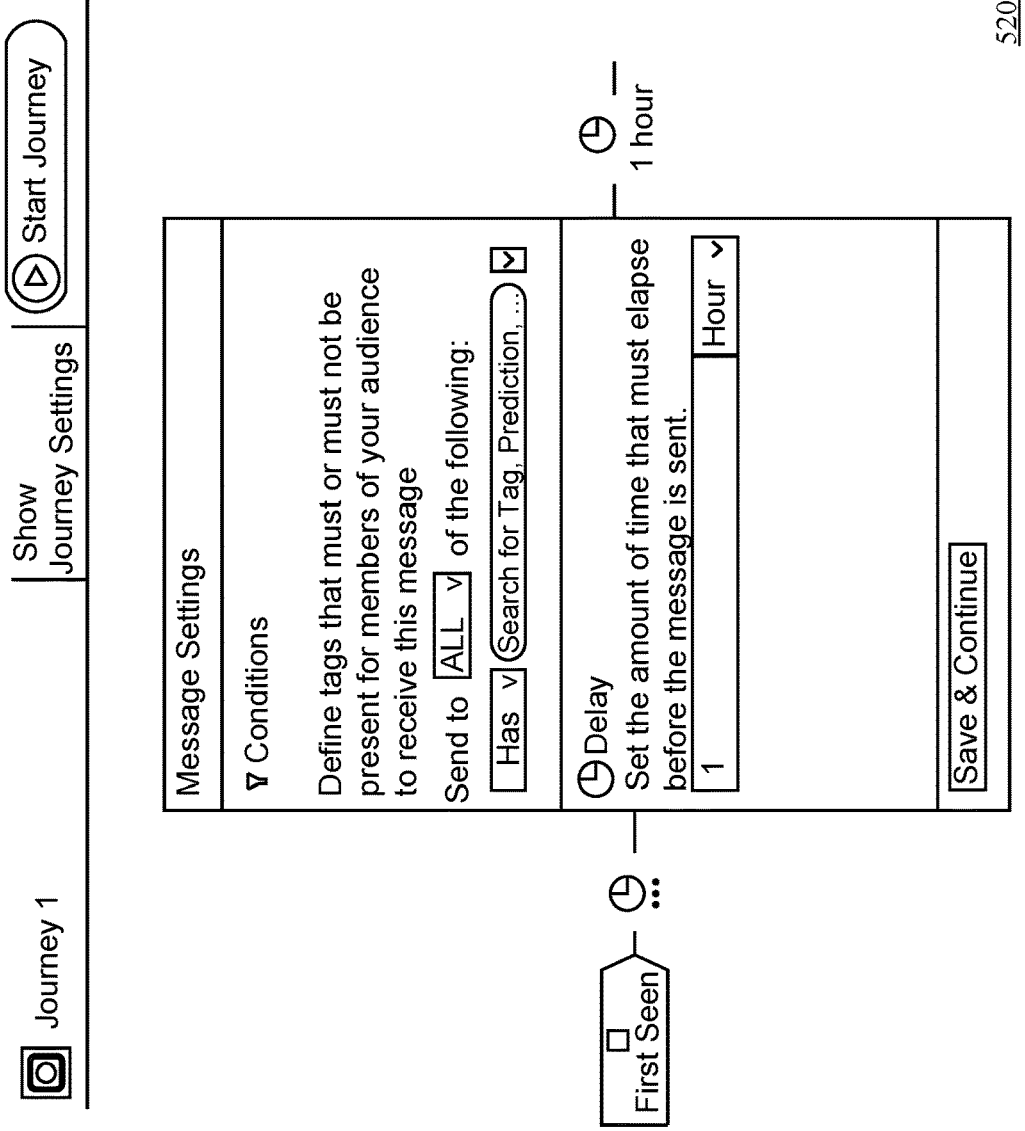

To continue to allow the message publisher 120 to build a message series 320, the message management server 110 may cause 430 the GUI to display a message plan builder 520 that includes certain control elements. FIG. 5B is an example of the GUI displaying a message plan builder 520. The message plan builder 520 provides information on various messages in the message series 320. The message publisher 120 may the message settings including triggering criteria for the message, target recipient selection criteria, channel selection rules and the message payload through the message composer. The message publisher 120, via the message series preview, may add, modified, and delete any messages in the message series 320.

The triggering criteria for the message are the conditions when a message will be sent. The triggering criteria may be based on time, such as the amount of time lapse after a condition is met before the message is sent. The triggering criteria may also be event-based criteria. The target recipient selection criteria may be metadata tag based. For example, the criteria may specify that the candidate recipients will need to include or exclude certain metadata tags to receive the message. Other suitable criteria for triggering conditions and recipient selection are discussed above with reference to the message series management engine 225 in FIG. 2.

Referring to FIG. 5C, for each message, the message publisher 120 may choose one or more channels 150 for the message to be transmitted. In one case, the message publisher 120 may specify that all messages in the message series 320 to be sent in the same channels 150. In another case, the message publisher 120 may construct a plan of message orchestration, which specifies various messages in the message series 320 to be sent via a different channel 150.

The selection of channels 150 may be based on various factors. In one case, the message publisher 120 may select the channels 150 for each message. In another case, the message publisher 120 may specify the selection of channels 150 based on time. For example, the message publisher 120 may select text messaging for daytime communications and emails for nighttime communications. In yet another case, the message publisher 120 may specify the selection of channels 150 based on tags associated with a target end user.

For example, before a message is sent, the message management server 110 may determine the tags that are associated with the target and select the channels 150.

In some embodiments, the message publisher 120 may also select the channels 150 based on the conditions met. For example, the message publisher 120 may specify that one of the messages will be sent if one of two alternative conditions are met. The message publisher 120 may specify the message be sent via a first channel 150 when a first condition is met and via a second channel 150 when a second conditional is met.

The message publisher 120 also may select a plurality of channels 150 and allow the message management server 110 to decide the channel 150 before a message is sent. The message management server 110 may select the channel 150 based on the type of event notifications received by the message management server 110, historical activities of the target end user, and other events and activities associated with the target end user and/or the nature of the message series 320. For example, an example source of notifications that allows the message management server 110 to monitor events that might meet a condition in the message series 320 may be mobile event notifications that are transmitted from an electronic device or an IOT device associated with the end user. The message management server 110 may select a channel 150 based on the mobile event notification received. For example, the message management server 110 may select to use a push notification channel when an event notification that meets a condition is recently transmitted from a mobile application indicating that the end user is active in using the mobile application. In another example, the message management server 110 may select to use text messaging when an event notification that meets a condition is transmitted from a web browser associated with a cell phone. The message management server 110 also may select a channel 150 based on the last active events. In other cases, the message management server 110 may select a channel 150 based on the end user's activities. For example, data regarding historical mobile application lifecycle events associated with the target end user may indicate that the end user is most active in using the mobile application between 7 pm and 9 pm daily. The message management server 110 may choose to send a message through an in-application message during the timeframe and through another channel 150 during another time. Other suitable ways, such as fan-out, for the message management server 110 to intelligently select a channel 150 is also possible. More discussions of channel selection rules are discussed above with reference to the orchestration strategy management engine 220 in FIG. 2.

The message management server 110 may cause GUI to provide a selection of end condition of an instance of the message series 320. For example, an end condition may specify that an instance of the message series 320 ends after the messages in the message series are sent to an end user. In another example, an end condition may specify that an instance of the message series ends when an event occurs. For example, the message series 320 may be associated with a promotion. The end condition may specify that the instance associated with an end user ends when the end user makes a purchase or the end user converts by clicking on a link that brings the end user to a product page or a landing page of a retailer. An instance of message series 320 may refer to an implementation of the message series 320 on a particular end user. For example, an instance may end with an end user when another instance may still be ongoing for another end user. In some embodiments, a message series 320 may also be associated with a time limit, which could be used as a default end condition for an instance of message series 320 after the initial message is sent.

Figure 5D:
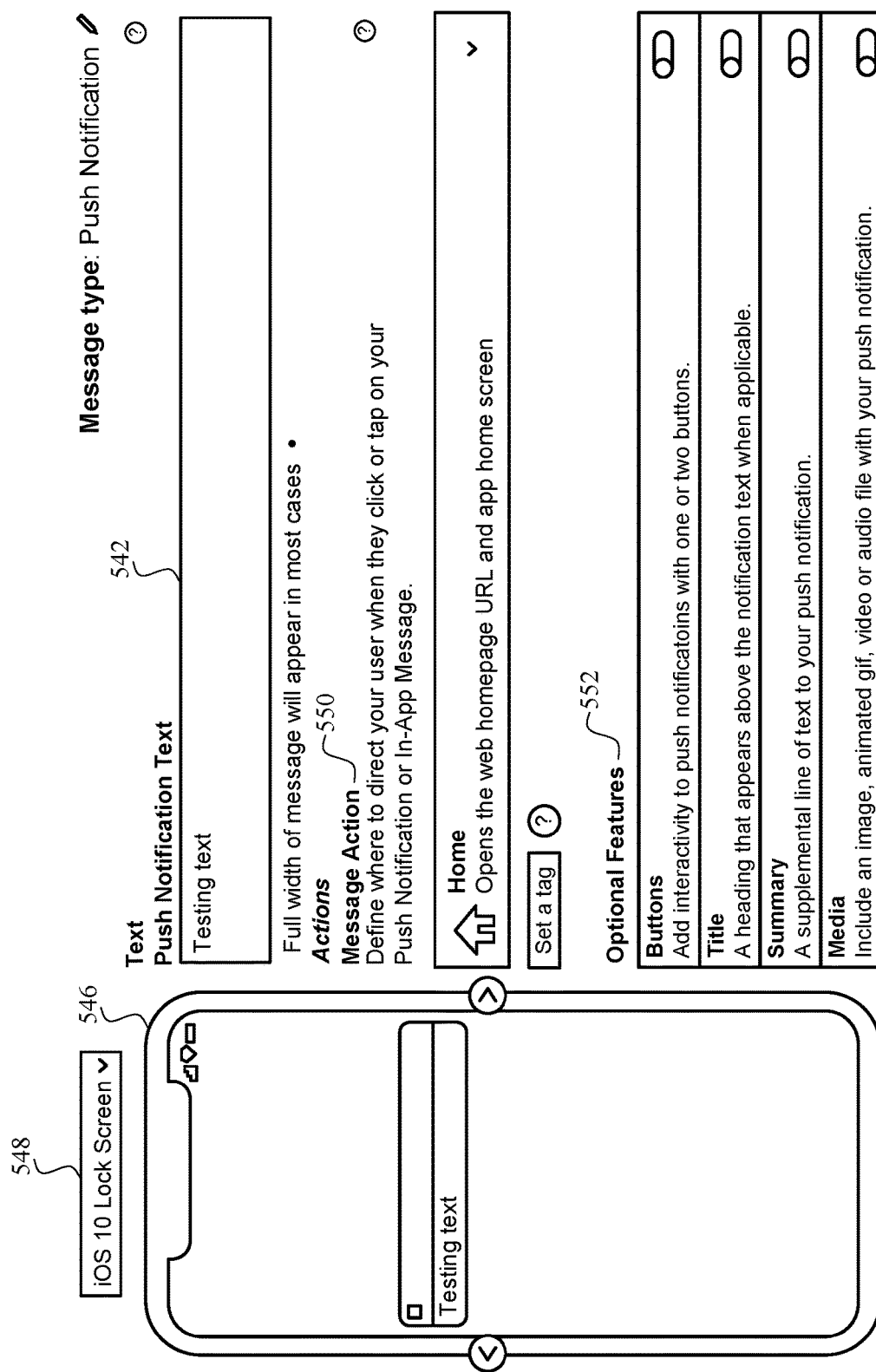

The message management server 110 may cause 440 the GUI to display a message composer for a message publisher 120 to specify the information and content related to a message payload 332. FIG. 5D is a conceptual diagram illustrating an example message composer 540. The GUI has an input field 542 for the message publisher 120 to input the text of the message. The GUI may provide a simulation 546 of the actual appearance of the message in an end user device that receives the message via a particular channel 150. The GUI may provide a selection 548 of potential end user device models. Upon a change in the selection of the end user device model, the GUI re-render another simulation of the actual appearance of the message based on the device model and the resolution of the device model. In some cases, certain types of channels or certain device models may not support certain formats or have limitations on the message payload (e.g., a certain channel may only support text and may resize an image in the message), the message management server 110 takes into account of those limitations in rendering the simulation. In the message composer 540, the message publisher 120 may also specify a message action 550 that defines where the end user should be directed when they take action on the message (e.g., tap on a push notification or an in-application message). The destination may be an URL, an application home screen, and launching another action. Through the message composer, the message publisher 120 may also specify other features 552 related to a message such as including an interactive button, a title of the message, a summary, and multimedia contents.

Figure 5E:
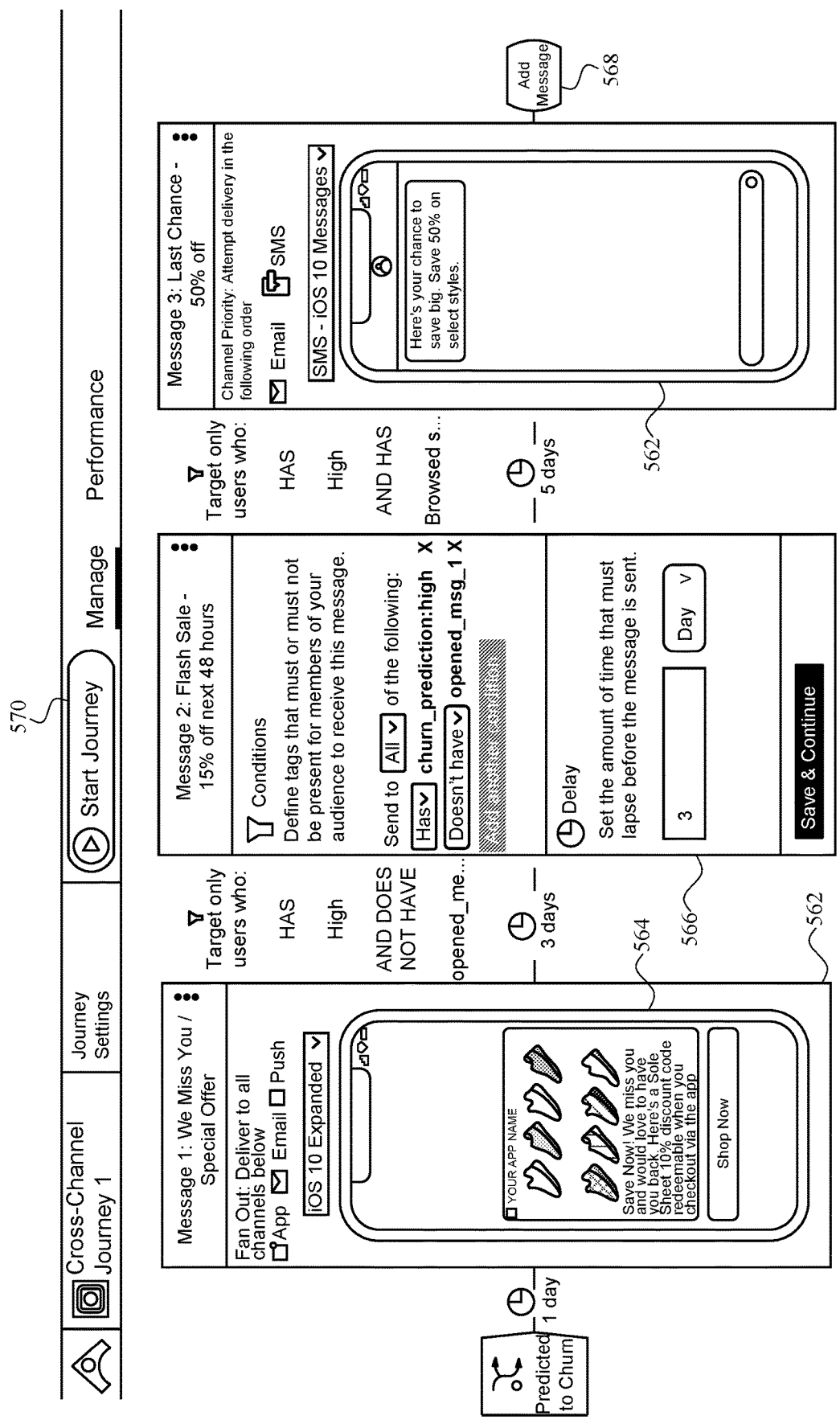

The message management server 110 may generate 450 a summary in the form of a message series preview 560. FIG. 5E is a conceptual diagram illustrating an example GUI that includes the message series preview 560. The previews of the messages may be shown as graphical elements and are arranged in the order of the message series. Each message preview 562 may include two sides. On the front side 564, a simulation of the actual appearance of the message based on a selection of the device model is displayed. The message publisher 120 may select a message preview and turn the message to a flip side 566. In turn, the GUI displays the message settings and includes control elements for the message publisher 120 to adjust the message settings. The GUI in the summary page may also include other information such as the targeting conditions of a message, a time delay between messages, and a control element 568 for the message publisher to add a new message in the series.

The GUI on the summary page may also include a control element 570 to allow the message publisher 120 to toggle between launching and pausing a message series 320. After a message series 320 is built, the message publisher 120 may launch the plan. The message management server 110 may receive 460 a command from the message publisher 120 to start a message series. The message management server 110 may automatically identify 470 target end users as message recipients 130 and transmit messages to the target end users based on the message series 320. The GUI may provide summary statistics of the message series 320 after the series is launched. For example, the message management server 110 may implement a plurality of instances of the message series 320, each instance associated with a message recipient 130. The message management server 110 may monitor the number of instances that meet the end condition as specified by the message publisher 120 before the expiration of the instance. The message management server 110 may generate a report summarizing the effectiveness of the message series 320. The message management server 110 may also provide real-time statistics in GUI.

In some embodiments, to initiate an instance of the message series 320 associated with a message recipient 130, the message management server 110 may monitor 470 events of various candidate end users to determine if the trigger of the message series 320 is met. The message management server 110 may monitor various candidate end users in different possible ways. In one case, the message management server 110 may provide an SDK to the message publisher 120 to develop a mobile application 134. The application 134 may be available for the end user to download and install at the end user's computing devices 132. In one case, the application 134 monitors the lifecycle events of the application, such as opening the application, using the application, closing the application, etc. and transmits mobile event notifications to the message management server 110. In another case, the IoT devices may be associated with one or more users and may also transmit different notifications to the message management server 110. In yet another case, the message management server 110 may rely on identifiers such as cookies, browser identifiers, mobile device identifiers to identify and monitor events associated with end users. The message management server 110 may also receive location data of the end users. In yet another case, the message management server 110 may cooperate with third parties to receive data related to the end users. The message management server 110 may identify an end user using a unique identifier and associate one or more metadata tags with the unique identifier as the message management server 110 receives event notifications from various sources.

The message management server 110 may compare one or more event notification to one or more rules specified in the initial trigger of the message series 320. In response to one of the event notifications matching the rules, the message management server 110 may identify the end user associated with the event notification. The message management server 110 may also check any additional limitations specified by the message publisher 120 regarding target end users. For example, the message publisher 120 may include or exclude certain metadata tags. If the message management server 110 confirms that the end user fits the criteria of a target end user, the message management server 110 may implement the message series 320 on the end user and create 480 an instance of the message series 320 with respect to the end user and transmit an initial message to the end user.

The message management server 110 may continue 490 to monitor additional event notifications to determine whether conditions for a second message in the message series 320 are met. In response to the conditions for the second message being met, the message management server 110 may transmit the second message and continue to implement the plan until an end condition specified by the message publisher 120 is met. The message management server 110 may also determine the channel 150 used to send a message and may send various messages via different channels 150.

Example Message Channel Re-Targeting Process

Figure 6:
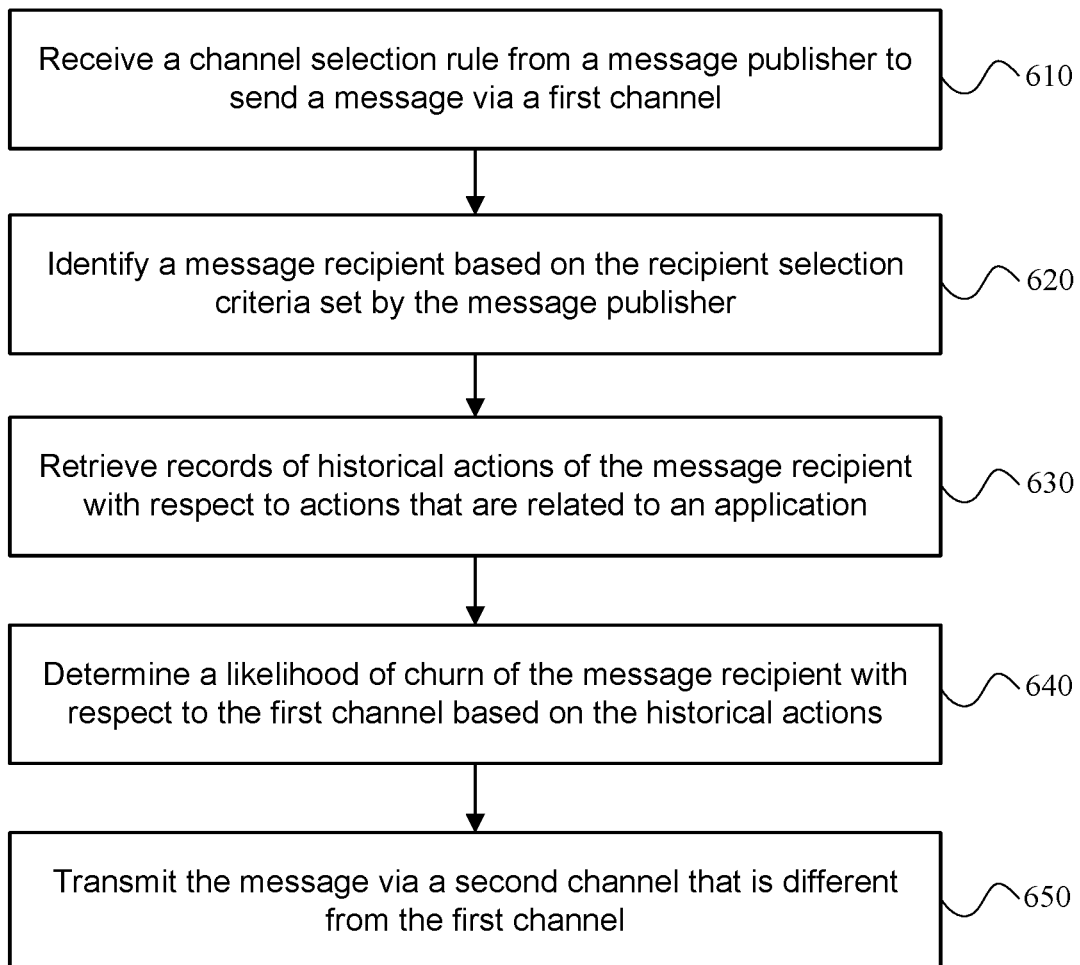
FIG. 6 is a flowchart depicting an example process for a message management server to perform message channel re-targeting, in accordance with some embodiments.

FIG. 6 is a flowchart depicting an example process 600 for a message management server 110 to perform message channel re-targeting, in accordance with some embodiments. In some cases, a message recipient 130 may tend to be more active and responsive for messages that are sent from some channels 150 while ignoring or being inactive for messages that are sent from other channels 150. For example, while an end user may have an application 134 installed in one of the user computing devices 132, the end user may seldom or never open or use the application 134. For messages sent via certain channels 150, such as push notifications or in-application messages, the end user may not read the message or react to the message because the channels 150 may be associated with the application 134 that the user rarely use. A message publisher 120 may specify a message to be sent via those channels 150. The messages will be ineffective with respect to getting the user's action and inducing the user to take certain actions. In such cases, the message management server 110 may perform channel re-targeting to send the message through an alternative channel that is less reliant or unrelated to the application 134.

In some embodiments, the message management server 110 may receive 610 a channel selection rule from a message publisher 120 to send a message via a first channel. The message management server 110 may identify 620 a message recipient 130 based on the recipient selection criteria set by the message publisher. The message management server 110 may retrieve 630 records of historical actions of the message recipient 130 with respect to actions that are related to an application. The records may be based on mobile event notifications sent to the message management server 110, cookies of the message recipient 130, and other sources as discussed in this disclosure. The message management server 110 may determine 640 a likelihood of churn of the message recipient 130 with respect to the first channel based on the historical actions. In response to the likelihood of churn being higher than a threshold, the message management server 110 may transmit 650 the message via a second channel that is different from the first channel. The second channel is an alternative channel that is less reliant on the application. The message publisher 120 may specify the second channel or the message management server 110 may automatically select the second channel.

The channel re-targeting may be used for any messages in a message series 320 or a primary message plan 310. The channel re-targeting may be a feature that can be selected by a message publisher 120 as a channel selection rule. Other features related to the channel re-targeting are discussed above with reference to FIG. 2 through FIG. 5E.

Example Goal-to-Goal Branching Message Campaign

Figure 7:
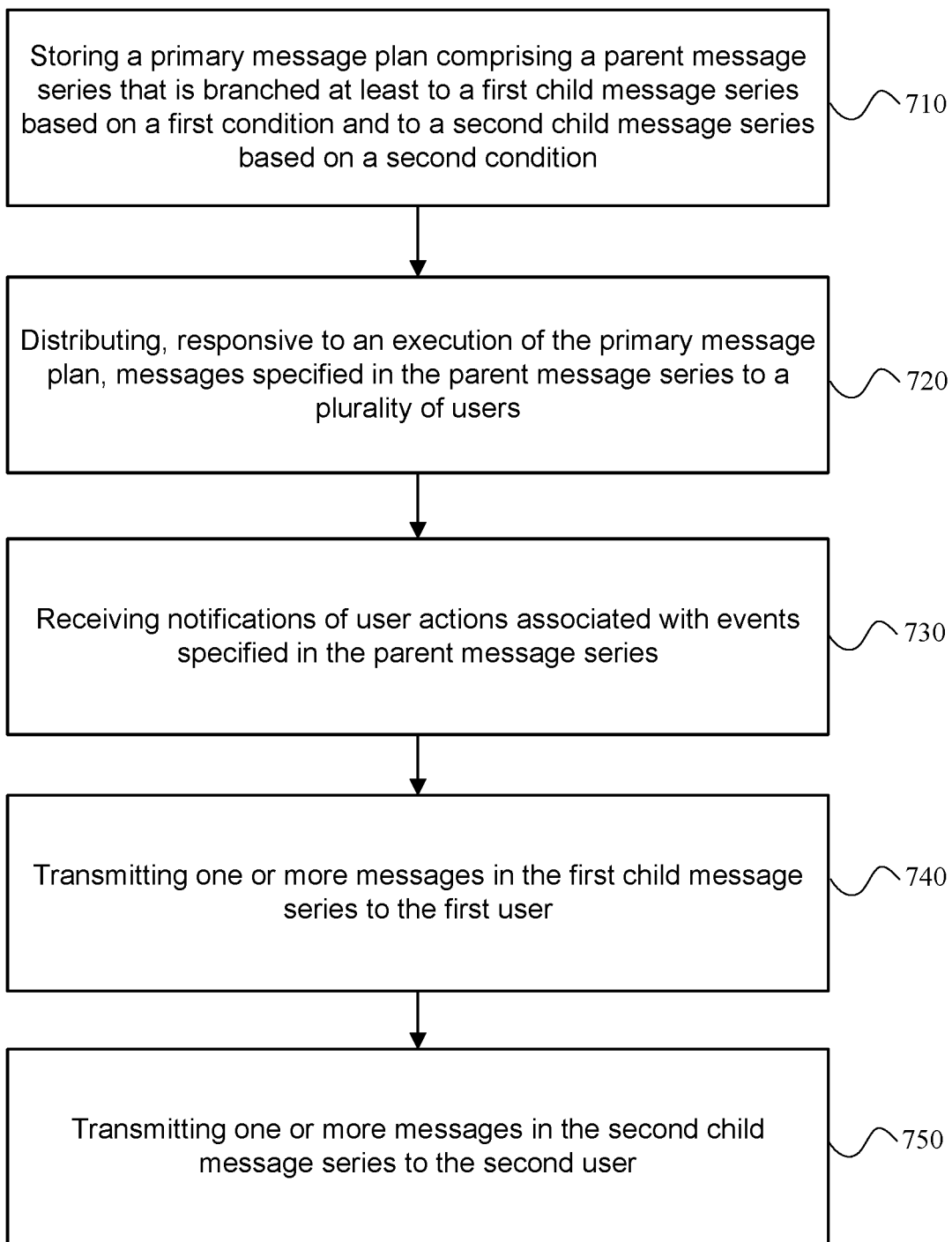
FIG. 7 is a flowchart depicting an example process for the message management server to implement a primary message plan, in accordance with some embodiments.
Figure 8:
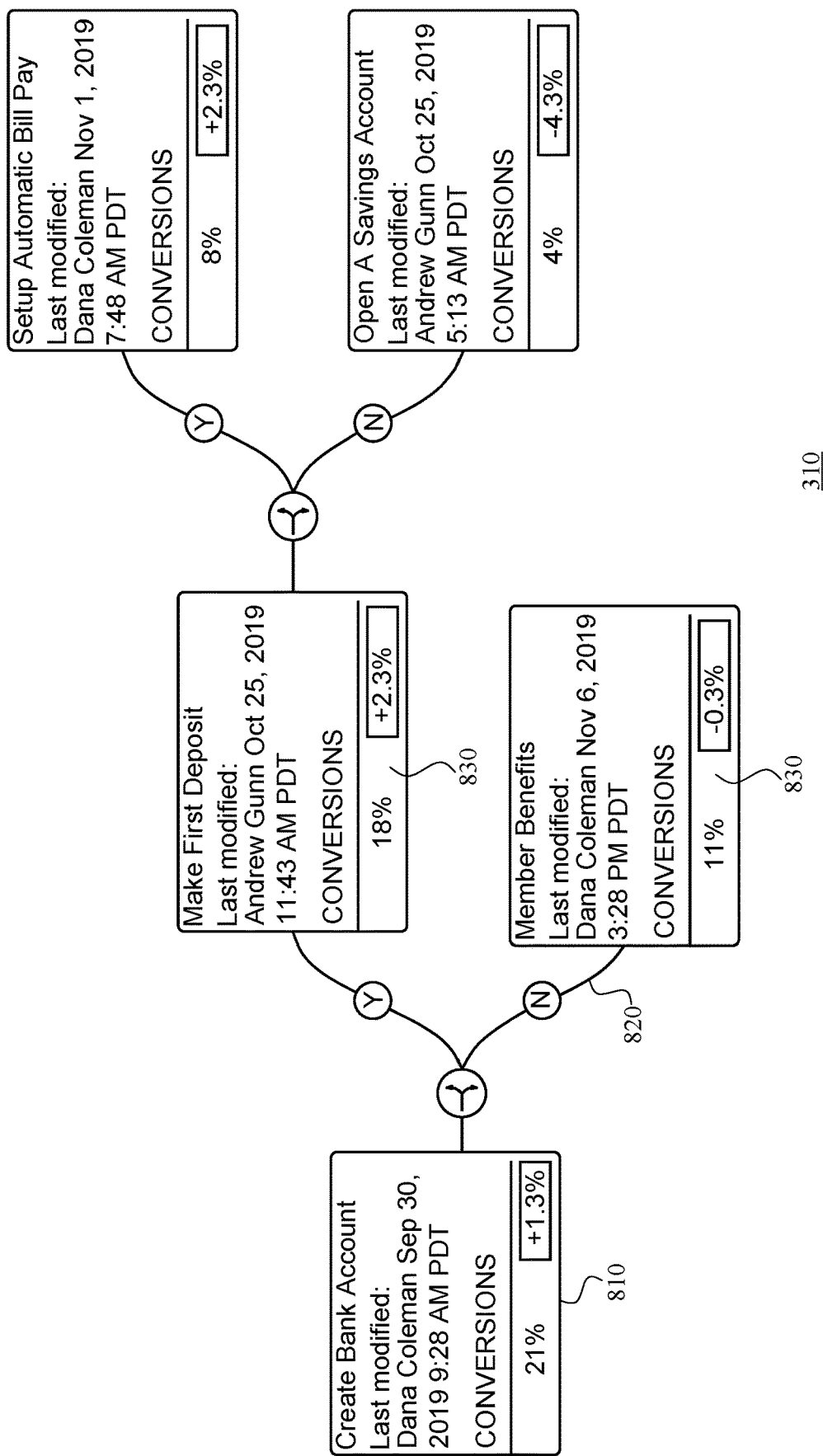
FIGS. 8 and 9 are conceptual diagrams illustrating example GUIs for displaying primary message plans and their analytics, in accordance with some embodiments.
Figure 9:
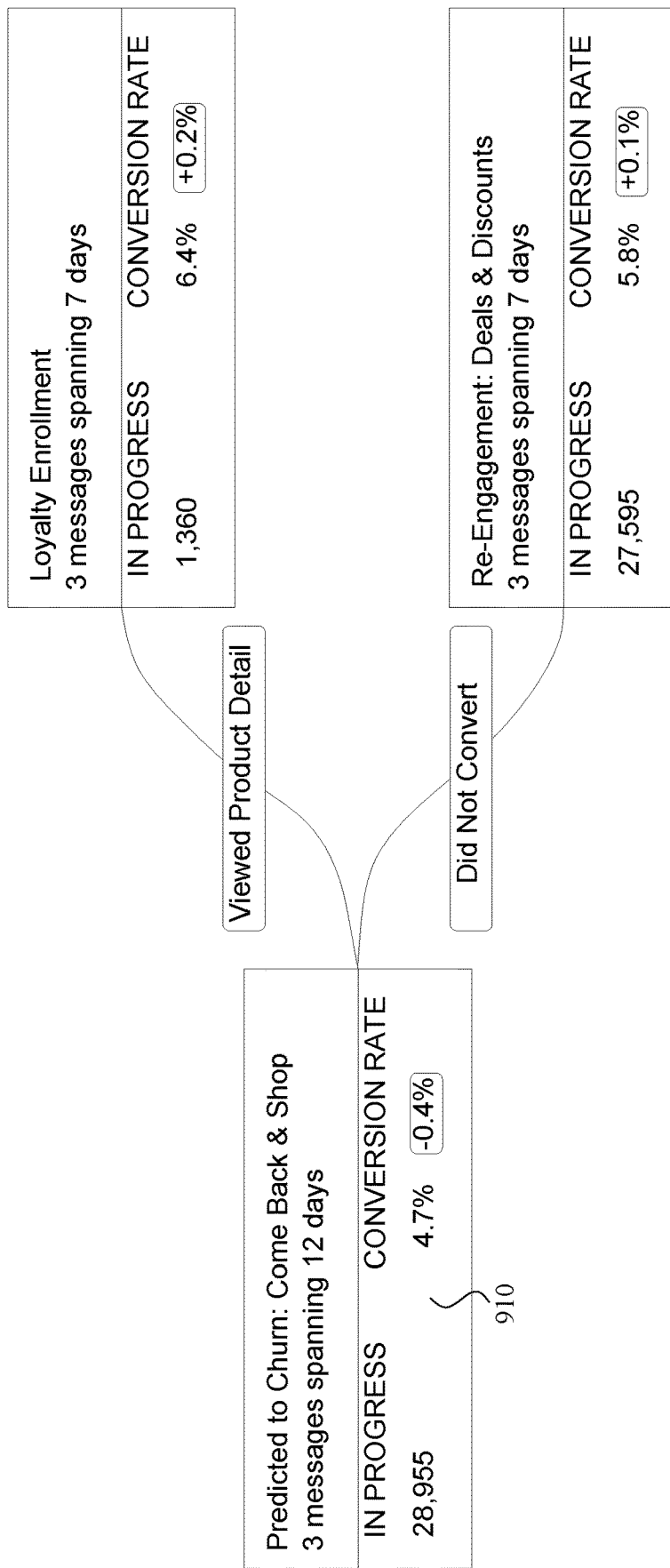

FIG. 7 is a flowchart depicting an example process 700 for the message management server 110 to implement a primary message plan 310, in accordance with some embodiments. FIGS. 8 and 9 are conceptual diagrams illustrating example GUIs for displaying primary message plans and their analytics, in accordance with some embodiments. FIG. 7 is discussed in conjunction with FIGS. 8 and 9.

In some embodiments, the message management server 110 provides a GUI for a message publisher 120 to design a primary message plan 310. FIG. 8 is an example of a visual representation of a primary message plan 310, according to an embodiment. The message management server 110 may provide a platform (e.g., an online application) for various message publishers 120 to design and build one or more primary message plans 310. The primary message plan 310 may be displayed at a GUI of a client device 125 of a message publisher 120. The visual representation of a primary message plan 310 may include multiple nodes 810 and edges 820. The nodes are represented by the rectangular boxes. Each node represents a message series 320. An edge connecting two nodes represents a transition between two message series 320.

The message management server 110 may store 710 the primary message plan 310 that includes a parent message series that is branched into at least a first child message series based on a first condition and a second child message series based on a second condition. At least one of the message series 320 may include multiple messages to be distributed and may be associated with one or more goals that represent end conditions of a message series 320. Some of the message series 320 may have multiple goals and are connected to two or more child message series 320. The primary message plan 310 may be branched and may be referred to as goal-to-goal branching. For example, in FIG. 8, the primary message plan 310 may be designed by a message publisher 120 that is a bank. A first node labeled as "Create Bank Account" may be a parent message series that is branched to a first child message series labeled as "Make First Deposit" and to a second child message series labeled as "Member Benefits." The parent message series "Create Bank Account" may be associated with a goal of getting an end user to click on a webpage link for creating a bank account. The parent message series may be associated with a first condition of a user clicking the webpage link and a second condition of a user not clicking the webpage link after a specified period. A user meeting the first condition will be brought to a first child message series, in which a series of one or more messages associated with "Make First Deposit" is sent to the user. A user meeting the second condition will be brought to a second child message series, in which another series of one or more messages associated with "Member Benefits" are sent to the user.

A message publisher 120 may build and edit the primary message plan 310 via a GUI that visually represents the primary message plan 310 or via other suitable methods such as API, uploading code that carries the plan, etc. In FIG. 8, a message publisher 120 may select one of the message series 320 by clicking on the node representing the message series 320. In response, the GUI displays a wizard to build or edit the selected message series 320. Examples of the wizard to build or edit a message series 320 are discussed above with reference to FIG. 5A through 5E. In the wizard, the message publisher 120 can define one or more conditions of meeting goals of the message series 320. The message publisher 120 can also link two or more message series 320 together. In some cases, at least one of the message series 320 in the primary message plan 310 is a channel orchestration message series 320 that specifies messages in the series to be distributed via a plurality of channels 150.

Each message series 320 may be a journey that includes multiple messages to be sent to a user in different time frames or to be sent in response to the occurrence of certain events identified in the message series 320. A journey of message series 320 may be completed in one of several ways, including conversion event, cancellation event, journey completion, etc. In the conversion event and the cancellation event, the message series 320 may be ended and transitioned to another downstream message series 320 in the primary message plan 310 at any time when the conversion event or the cancellation event is detected. The message series 320 may also end when the final message defined in the message series 320 is sent or when the journal reaches the time limit. The completion of a journey of the message series 320 may be followed by another journey as defined in the primary message plan 310.

After one or more message series 320 that have end conditions defined are linked together, the message publisher 120 may switch to a map view that shows the graphical representation of the primary message plan 310 and the connections among the message series 320, as shown in FIG. 8. Each message series 320 or the overall primary message plan 310 may be associated with a command button that allows the message publisher 120 to start, pause, and resume the message series 320 or the primary message plan 310. When a primary message plan 310 is being executed, the message management server 110 may provide analytics 830 of the primary message plan 310 to the message publisher 120. FIG. 9 is an example of a map view of the primary message plan 310 and the analytics 910 provided. For example, in the node "Predicted to Churn: Come Back & shop," the message series 320 has "3 messages spanning 12 days." 28,955 users are in process of this message series 320. Other example analytics may be the conversion rate and the change in conversion rate, which are displayed as 4.7% and minus 0.4%. The analytics may be updated in real-time as the primary message plan 310 is implemented.

In response to receiving a command from the message publisher 120 to execute the primary message plan 310, the message management server 110 distributes 720 messages specified in one or more message series 320 to a plurality of message recipients 130. For example, the primary message plan 310 may include a parent message series, which includes a trigger that specifies what kinds of users, user actions, and/or events may trigger the first message in the parent message series to be sent to a user. The message management server 110 receives data and information related to different users. In response to the trigger being met, the message management server 110 distributes the first message in the parent message series to those users. The message management server 110 continues to receive various user data as different users may progress through various journeys defined by the primary message plan 310 at different paces. The message management server 110 continues to distribute different messages specified in various message series 320 to different users. The message publisher 120 may pause or resume the distribution process.

As the message management server 110 continues to distribute messages via a plurality of channels 150, the message management server 110 may receive 730 notifications of user actions associated with events specified in one or more message series 320. Some notifications may indicate that certain users meet one or more end conditions of a message series 320 to move on to the next message series 320 in the primary message plan 310. For example, the message management server 110 may receive notifications of user actions associated with events specified in a parent message series. A first notification may indicate that a first user meets a first condition of the parent message series. A second notification may indicate that a second user meets the second condition of the parent message series. Based on the primary message plan 310, the message management server 110 transmits 740 one or more messages in a first child message series to the first user. Based on the branching of the primary message plan 310, the message management server 110 transmits 750 one or more messages in a second child message series to the second user.

As the message management server 110 distributes messages to various users, the message management server 110 may also provide analytics of the primary message plan 310. The message management server 110 may cause a GUI that displays the map of the primary message plan 310 to present the analytics as the execution of the primary message plan 310 continues to develop, as shown in FIG. 9. In some embodiments, the analytics may be in real-time and include various metrics of each message series 320. For example, in each node of the map of the primary message plan 310, the GUI may display the number of users who are currently in the message series 320. For a message series 320 that has two or more conditions, the analytics may also be the percentage of users who meet the first condition and who meet the second condition respectively. The analytics may also be the conversion rate of a particular journey.

Computing Machine Architecture

Figure 10:
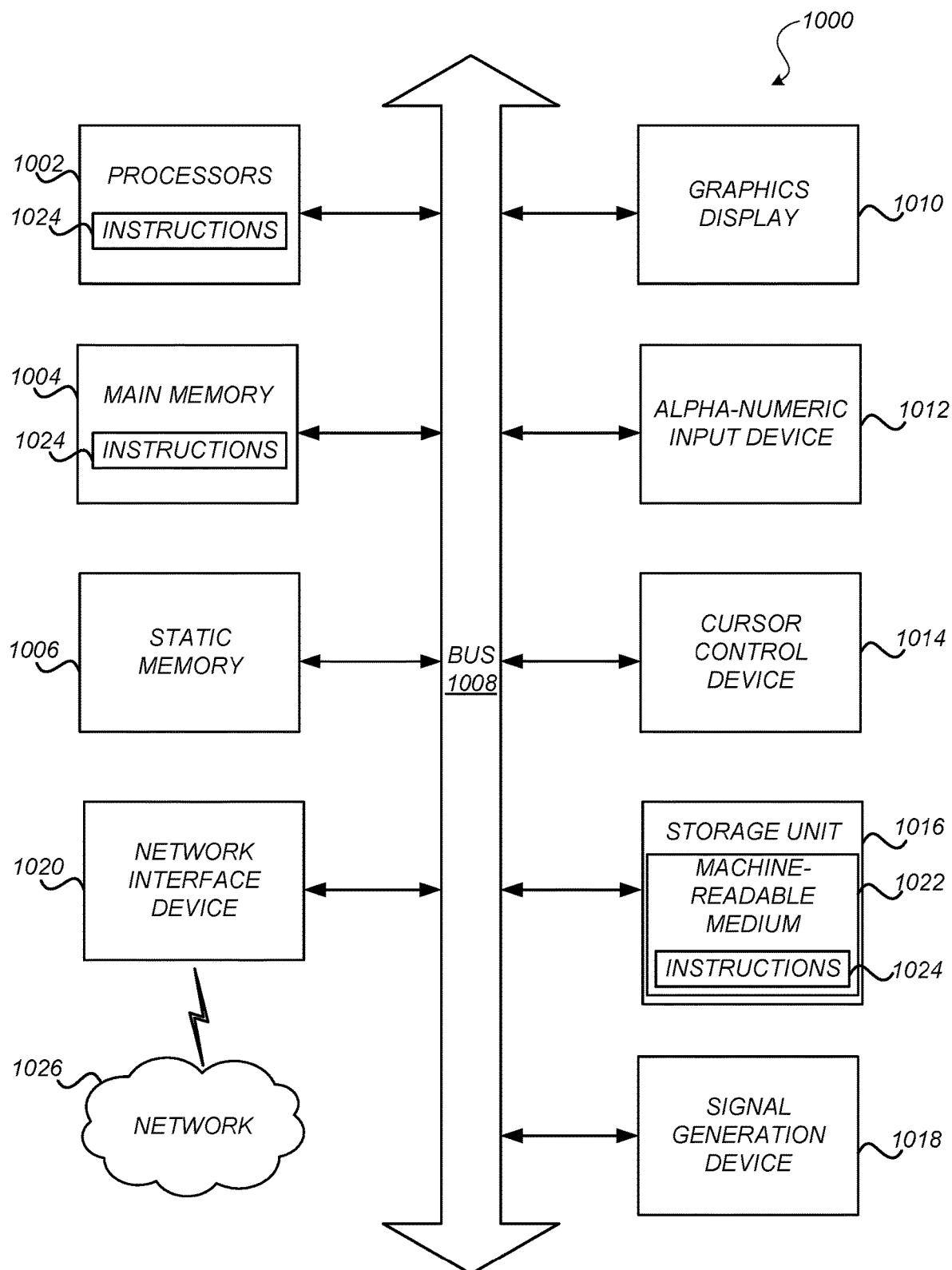
FIG. 10 is a block diagram illustrating components of an example computing machine, in accordance with some embodiments.

FIG. 10 is a block diagram illustrating components of an example computing machine that is capable of reading instructions from a computer-readable medium and execute them in a processor (or controller). A computer described herein may include a single computing machine shown in FIG. 10, a virtual machine, a distributed computing system that includes multiples nodes of computing machines shown in FIG. 10, or any other suitable arrangement of computing devices.

By way of example, FIG. 10 shows a diagrammatic representation of a computing machine in the example form of a computer system 1000 within which instructions 1024 (e.g., software, source code, program code, bytecode, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 10 may correspond to any software, hardware, or combined components shown in FIGS. 1 and 2, including but not limited to, the message management server 110, the client device 125, the user computing device 132 and various engines, interfaces, terminals, and machines shown in FIG. 2. While FIG. 10 shows various hardware and software elements, each of the components described in FIG. 1 or FIG. 2 may include additional or fewer elements. Further, the instructions may correspond to the functionality of components and interfaces described with FIGS. 1-9.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 that specify actions to be taken by that machine. Further, while only a single machine is illustrated, the term "machine" and "computer" may also be taken to include any collection of machines that individually or jointly execute instructions 1024 to perform any one or more of the methodologies discussed herein.

The example computer system 1000 includes one or more processors 1002 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 1000 may also include a memory 1004 that store computer code including instructions 1024 that may cause the processors 1002 to perform certain actions when the instructions are executed, directly or indirectly by the processors 1002. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1002 and reduces the space required for the memory 1004. For example, the methods described herein reduce the complexity of the computation of the processors 1002 by applying one or more novel techniques that simplify the steps in training, reaching convergence, and generating results of the processors 1002. The algorithms described herein also reduces the size of the models and datasets to reduce the storage space requirement for memory 1004.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1000 may include a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The graphics display unit 1010, controlled by the processors 1002, displays a GUI (GUI) to display one or more results and data generated by the processes described herein. The computer system 1000 may also include an alphanumeric input device 1012 (e.g., a keyboard), a cursor control device 1014 (e.g., a mouse, a trackball, a joystick, a motion sensor, or another pointing instrument), a storage unit 1016 (a hard drive, a solid state drive, a hybrid drive, a memory disk, etc.), a signal generation device 1018 (e.g., a speaker), and a network interface device 1020, which also are configured to communicate via the bus 1008.

The storage unit 1016 includes a computer-readable medium 1022 on which is stored instructions 1024 embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting computer-readable media. The instructions 1024 may be transmitted or received over a network 1026 via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store instructions (e.g., instructions 1024). The computer-readable medium may include any medium that is capable of storing instructions (e.g., instructions 1024) for execution by the processors (e.g., processors 1002) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, the message management server provides a platform for various message publishers to delegate the task of distributing messages via various channels to the message management server. Transmission of messages through different channels may be technically challenging for many organizations because each channel may have its own requirement, communication protocol, infrastructure with which organizations may not be equipped. By providing a user-friendly user interface to the message publishers for them to build message series, the message management server manages the technical difficulties for the message publishers. The appearance, contents, and overall feeling of the message may be changed significantly when a different channel is used to deliver the message. The graphical user interface may also provide simulations of the messages as rendered in end users' computing devices, thereby providing the message publishers with previews of the messages that could have dramatically different appearances when transmitted via different channels and rendered in different operating systems and models of computing devices.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system, comprising:
    a graphical user interface configured to:
        receive selections, from a message publisher, to build a message series, the message series comprising an initial message and an additional message, the initial message in the message series selected to be sent via a short messaging service (SMS) and the additional message in the message series selected to be sent via a communication channel, the additional message associated with a trigger condition that monitors a user action performable in relation to the initial message sent via the SMS, and
        generate a message series preview of the message series, the message series preview comprising a first simulation of the initial message as would be rendered in a user computing device received via SMS and a second simulation of the additional message as would be rendered in the user computing device received via the communication channel, wherein a type of the user computing device is selectable to generate different simulations, and rendering the different simulations by the graphical user interface is selectable for different device models of the user computing device; and
    a message management server, the message management server comprising one or more processors and memory storing instructions, the instructions, when executed by the one or more processors, cause the one or more processors to:
        enable the graphical user interface for display at a client device of the message publisher for the message publisher to build the message series,
        receive a command from the client device of the message publisher to launch the message series, and transmit the initial message to an end user computing device via SMS;
        determine, responsive to a user of the end user computing device performing the user action in relation to the initial message transmitted via the SMS, that the trigger condition is met;
        transmit the additional message to the end user computing device via the communication channel; and
        enable updating of the graphical user interface to show statistics related to distribution of the message series.

2. The system of claim 1, wherein the user action performable in relation to the initial message transmitted via the SMS is one of viewing the initial message or responding to the initial message.

3. The system of claim 1, wherein the initial message is sent to the end user computing device based on one or more trigger conditions, and wherein the instructions, when executed by the one or more processors of the message management server, further cause the one or more processors to:
    receive one or more mobile event notifications transmitted from a plurality of end user computing devices;
    compare the one or more mobile event notifications to the one or more trigger conditions; and
    select, responsive to one of the mobile event notifications matching the one or more trigger conditions, the end user computing device from the plurality of end user computing devices as a recipient of the initial message.

4. The system of claim 3, wherein the one or more trigger conditions are selected from one or more of the following:
    a tag change trigger that is triggered responsive to a tag being added or removed;
    an inactivity trigger that is triggered responsive to a mobile application associated with an end user being inactive for a duration;
    a first-seen trigger that is triggered responsive to an end user first opening a mobile application or opts in on a website, email, SMS, or an open channel;
    a location trigger that is triggered responsive to an end user device entering or exiting a location;
    a risk category trigger that classifies an end user to one of a plurality of risk levels and is triggered responsive to the end user entering a target risk level;
    a location attribute trigger that is triggered responsive to an end user device entering or exiting a location with predefined attributes; and
    an event trigger that is triggered responsive to a detection of an event.

5. The system of claim 1, wherein the communication channel is one of the following:
    the SMS used to transmit the initial message;
    an additional SMS;
    an email protocol;
    a push notification protocol;

an in-application message;
an instant messaging application; or
a social networking system.

6. The system of claim 1, wherein the instructions, when executed by the one or more processors, further cause the one or more processors to:
receive, from the message publisher via the graphical user interface, a plurality of end conditions of the message series, the end conditions comprising:
a first end condition specifying that the message series ends after the initial and additional messages in the message series are sent; and
a second end condition specifying that the message series ends when an event occurs.

7. The system of claim 1, wherein the graphical user interface includes a toggle for the message publisher to select between launching the message series and pausing the message series.

8. A computer-implemented method, comprising:
enabling a graphical user interface for display at a client device of a message publisher for the message publisher to build a message series;
receiving selections, via the graphical user interface from the message publisher, to build a message series, the message series comprising an initial message and an additional message, the initial message in the message series selected to be sent via a short messaging service (SMS) and the additional message in the message series selected to be sent via a communication channel, the additional message associated with a trigger condition that monitors a user action performable in relation to the initial message sent via the SMS;
enabling the graphical user interface for display a message series preview of the message series, the message series preview comprising a first simulation of the initial message as would be rendered in a user computing device received via SMS and a second simulation of the additional message as would be rendered in the user computing device received via the communication channel, wherein a type of the user computing device is selectable to generate different simulations, and rendering the different simulations by the graphical user interface is selectable for different device models of the user computing device;
receiving a command from the client device of the message publisher to launch the message series;
transmitting the initial message to one or more end user computing devices of message recipients via the SMS;
determining, responsive to a user of the end user computing device performing the user action in relation to the initial message transmitted via the SMS, that the trigger condition is met;
transmitting the additional message to the end user computing device via the communication channel; and
enabling updating of the graphical user interface to show statistics related to distribution of the message series.

9. The computer-implemented method of claim 8, wherein the user action performable in relation to the initial message transmitted via the SMS is one of viewing the initial message or responding to the initial message.

10. The computer-implemented method of claim 8, wherein the initial message is sent to the end user computing device based on one or more trigger conditions, and further comprising:
receiving one or more mobile event notifications transmitted from a plurality of end user computing devices;
comparing the one or more mobile event notifications to the one or more trigger conditions; and
selecting, responsive to one of the mobile event notifications matching the one or more trigger conditions, the end user computing device from the plurality of end user computing devices as a recipient of the initial message.

11. The computer-implemented method of claim 10, wherein the one or more trigger conditions are selected from one or more of the following:
a tag change trigger that is triggered responsive to a tag being added or removed;
an inactivity trigger that is triggered responsive to a mobile application associated with an end user being inactive for a duration;
a first-seen trigger that is triggered responsive to an end user first opening a mobile application or opts in on a website, email, SMS, or an open channel;
a location trigger that is triggered responsive to an end user device entering or exiting a location;
a risk category trigger that classifies an end user to one of a plurality of risk levels and is triggered responsive to the end user entering a target risk level;
a location attribute trigger that is triggered responsive to an end user device entering or exiting a location with predefined attributes; and
an event trigger that is triggered responsive to a detection of an event.

12. The computer-implemented method of claim 8, wherein the graphical user interface includes a toggle for the message publisher to select between launching the message series and pausing the message series.

13. The computer-implemented method of claim 8, further comprising:
receiving, from the message publisher via the graphical user interface, a plurality of end conditions of the message series, the end conditions comprising:
a first end condition specifying that the message series ends after the initial and additional messages in the message series are sent; and
a second end condition specifying that the message series ends when an event occurs.

14. A non-transitory computer readable medium for storing computer code comprising instructions, the instructions, when executed by one or more processors, cause the one or more processors to:
enable a graphical user interface for display at a client device of a message publisher for the message publisher to build a message series;
receive selections, via the graphical user interface from the message publisher, to build a message series, the message series comprising an initial message and an additional message, the initial message in the message series selected to be sent via a short messaging service (SMS) and the additional message in the message series selected to be sent via a communication channel, the additional message associated with a trigger condition that monitors a user action performable in relation to the initial message sent via the SMS;
enable the graphical user interface for display a message series preview of the message series, the message series preview comprising a first simulation of the initial message as would be rendered in a user computing device received via SMS and a second simulation of the additional message as would be rendered in the user computing device received via the communication channel, wherein a type of the user computing device is selectable to generate different simulations, and rendering the different simulations by the graphical user interface is selectable for different device models of the user computing device;

receive a command from the client device of the message publisher to launch the message series;

transmit the initial message to one or more end user computing devices of message recipients via the SMS;

determine, responsive to a user of the end user computing device performing the user action in relation to the initial message transmitted via the SMS, that the trigger condition has been met;

transmit the additional message to the end user computing device via the communication channel; and enable updating of the graphical user interface to show statistics related to distribution of the message series.

15. The computer readable medium of claim 14, wherein the user action performable in relation to the initial message transmitted via the SMS is one of viewing the initial message or responding to the initial message.

16. The computer readable medium of claim 14, wherein the initial message is sent to the end user computing device based on one or more trigger conditions, and wherein the instructions, when executed by the one or more processors, further cause the one or more processors to:

receive one or more mobile event notifications transmitted from a plurality of end user computing devices;

compare the one or more mobile event notifications to the one or more trigger conditions; and select, responsive to one of the mobile event notifications matching the one or more trigger conditions, the end user computing device from the plurality of end user computing devices as a recipient of the initial message.

17. The computer readable medium of claim 16, wherein the one or more trigger conditions are selected from one or more of the following:

a tag change trigger that is triggered responsive to a tag being added or removed;

an inactivity trigger that is triggered responsive to a mobile application associated with an end user being inactive for a duration;

a first-seen trigger that is triggered responsive to an end user first opening a mobile application or opts in on a website, email, SMS, or an open channel;

a location trigger that is triggered responsive to an end user device entering or exiting a location;

a risk category trigger that classifies an end user to one of a plurality of risk levels and is triggered responsive to the end user entering a target risk level;

a location attribute trigger that is triggered responsive to an end user device entering or exiting a location with predefined attributes; and an event trigger that is triggered responsive to a detection of an event.

18. The non-transitory computer readable medium of claim 14, wherein the graphical user interface includes a toggle for the message publisher to select between launching the message series and pausing the message series.

19. The non-transitory computer readable medium of claim 14, wherein the instructions, when executed by the one or more processors, further cause the one or more processors to:

receive, from the message publisher via the graphical user interface, a plurality of end conditions of the message series, the end conditions comprising:

a first end condition specifying that the message series ends after the initial and additional messages in the message series are sent; and a second end condition specifying that the message series ends when an event occurs.

* * * * *